United States Patent
Uchida et al.

(10) Patent No.: US 12,041,176 B2
(45) Date of Patent: Jul. 16, 2024

(54) INFORMATION PROCESSING DEVICE AND INFORMATION PROCESSING METHOD FOR PROVIDING SECURE ENCRYPTION BY SHARING WORD DIVISION BETWEEN CLIENT AND SERVER

(71) Applicant: SONY GROUP CORPORATION, Tokyo (JP)

(72) Inventors: Atsushi Uchida, Tokyo (JP); Shinya Maruyama, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 587 days.

(21) Appl. No.: 17/290,117

(22) PCT Filed: Nov. 19, 2019

(86) PCT No.: PCT/JP2019/045275
§ 371 (c)(1),
(2) Date: Apr. 29, 2021

(87) PCT Pub. No.: WO2020/110830
PCT Pub. Date: Jun. 4, 2020

(65) Prior Publication Data
US 2022/0311621 A1 Sep. 29, 2022

(30) Foreign Application Priority Data
Nov. 26, 2018 (JP) .................. 2018-220038

(51) Int. Cl.
*H04L 29/06* (2006.01)
*H04L 9/00* (2022.01)
(Continued)

(52) U.S. Cl.
CPC ............ *H04L 9/3242* (2013.01); *H04L 9/008* (2013.01); *H04L 9/085* (2013.01); *H04L 9/3093* (2013.01)

(58) Field of Classification Search
CPC ....... H04L 9/3242; H04L 9/008; H04L 9/085; H04L 9/3093; H04L 9/0841; H04L 9/3236
See application file for complete search history.

(56) References Cited

U.S. PATENT DOCUMENTS 9,288,039 B1* 3/2016 Monet ............... H04L 9/008
2012/0159180 A1* 6/2012 Chase ............... G06F 21/6227
713/184

FOREIGN PATENT DOCUMENTS

| JP | H05-307570 A | 11/1993 |
|---|---|---|
| JP | 2016-200938 A | 12/2016 |

(Continued)

*Primary Examiner* — Harunur Rashid
(74) *Attorney, Agent, or Firm* — Paratus Law Group, PLLC

(57) ABSTRACT

There is provided an information processing device including: a communication unit configured to receive a first hash value calculated using a first sharing key from a terminal; and a dividing unit configured to determine a division unit of a word used for document search on the basis of matching between an encryption dictionary and a second hash value that is calculated by performing a homomorphic hash operation on the first hash value using a second sharing key corresponding to the first sharing key, in which the communication unit transmits, to the terminal, encrypted information related to the division unit determined by the dividing unit.

20 Claims, 20 Drawing Sheets

(51) Int. Cl.
*H04L 9/08* (2006.01)
*H04L 9/30* (2006.01)
*H04L 9/32* (2006.01)

(56) References Cited

FOREIGN PATENT DOCUMENTS

JP        2018-029268 A      2/2018
WO    WO-2017168798 A1 * 10/2017 ............. G06F 16/00

* cited by examiner

FIG. 7

| ENCRYPTED INDEX | DOCUMENT ID |
|---|---|
| $g\hat{}(W^9 \cdot +k)$ | A, B |
| $g\hat{}(W^{17} \cdot +k)$ | B |
| $g\hat{}(W^{11} \cdot +k)$ | A, B, C |
| $g\hat{}(W^{39} \cdot +k)$ | C |
| ⋮ | ⋮ |

FIG. 8

| DOCUMENT ID | DOCUMENT BODY |
|---|---|
| A | ... |
| B | ... |
| C | ... |
| ⋮ | ⋮ |

FIG. 13

| DOCUMENT ID | SHARING SOURCE USER | SHARING DESTINATION USER |
|---|---|---|
| A | α | |
| B | α | β, γ |
| C | α | β, δ |
| D | β | α |
| ⋮ | ⋮ | ⋮ |

INFORMATION PROCESSING DEVICE AND INFORMATION PROCESSING METHOD FOR PROVIDING SECURE ENCRYPTION BY SHARING WORD DIVISION BETWEEN CLIENT AND SERVER

CROSS REFERENCE TO PRIOR APPLICATION

This application is a National Stage Patent Application of PCT International Patent Application No. PCT/JP2019/045275 (filed on Nov. 19, 2019) under 35 U.S.C. § 371, which claims priority to Japanese Patent Application No. 2018-220038 (filed on Nov. 26, 2018), which are all hereby incorporated by reference in their entirety.

TECHNICAL FIELD

The present disclosure relates to an information processing device and an information processing method.

BACKGROUND ART

In recent years, with the spread of cloud services and the like, situations where data of individuals and companies is stored on a server managed by a service provider are increasing. The above-described servers typically encrypt data in order to ensure security. Furthermore, in recent years, a searchable encryption technique that realizes information search from data remaining encrypted has also been developed as described, for example, in Patent Document 1.

CITATION LIST

Patent Document

Patent Document 1: Japanese Patent Application Laid-Open No. 2016-200938

SUMMARY OF THE INVENTION

Problems to be Solved by the Invention

However, in the search system described in Patent Document 1, documents transmitted from client terminals are encrypted, and indices are created on the server side installed in the cloud. Therefore, in the search system described in Patent Document 1, the data in a plain text may be leaked in a case where, for example, data is intercepted when a document is transmitted from a client.

Solutions to Problems

The present disclosure provides an information processing device including: a communication unit configured to receive a first hash value calculated using a first sharing key from a terminal; and a dividing unit configured to determine a division unit of a word used for document search on the basis of matching between an encryption dictionary and a second hash value that is calculated by performing a homomorphic hash operation on the first hash value using a second sharing key corresponding to the first sharing key, in which the communication unit transmits, to the terminal, encrypted information related to the division unit determined by the dividing unit.

Furthermore, the present disclosure provides an information processing device including: an encryption unit configured to calculate a first hash value by performing a homomorphic hash operation, using a first sharing key, on a division candidate of a word included in a document to be searched for; and a communication unit configured to transmit the first hash value to an external device, in which the communication unit receives, from the external device, encrypted information related to a division unit of a word for document search that is determined on the basis of matching between an encryption dictionary and a second hash value calculated by a homomorphic hash operation using a second sharing key corresponding to the first hash value.

Furthermore, the present disclosure provides an information processing method performed by a processor, the information processing method including: receiving a first hash value calculated using a first sharing key from a terminal; and determining a division unit of a word used for document search on the basis of matching between an encryption dictionary and a second hash value that is calculated by performing a homomorphic hash operation on the first hash value using a second sharing key corresponding to the first sharing key, and transmitting, to the terminal, encrypted information related to the division unit.

Furthermore, the present disclosure provides an information processing method performed by a processor, the information processing method including: calculating a first hash value by performing a homomorphic hash operation, using a first sharing key, on a division candidate of a word included in a document to be searched for; transmitting the first hash value to an external device; and receiving, from the external device, encrypted information related to a division unit of a word for document search that is determined on the basis of matching between an encryption dictionary and a second hash value calculated by a homomorphic hash operation using a second sharing key corresponding to the first hash value.

It should be noted that the above-described effects are not necessarily limited, and together with or in place of the above-described effects, any of the effects described herein, or any other effect that can be grasped from this specification may be exhibited.

BRIEF DESCRIPTION OF DRAWINGS

FIG. 7 is an example of a table indicating association between the encrypted indices and documents, which are held by an index storage unit according to the first embodiment.

FIG. 8 is an example of a table in which document bodies and document IDs held by the data storage unit according to the first embodiment are stored.

FIG. 13 is an example of a table indicating the correspondence between sharing source users and sharing destination users according to the first embodiment.

MODE FOR CARRYING OUT THE INVENTION

Figure 1:
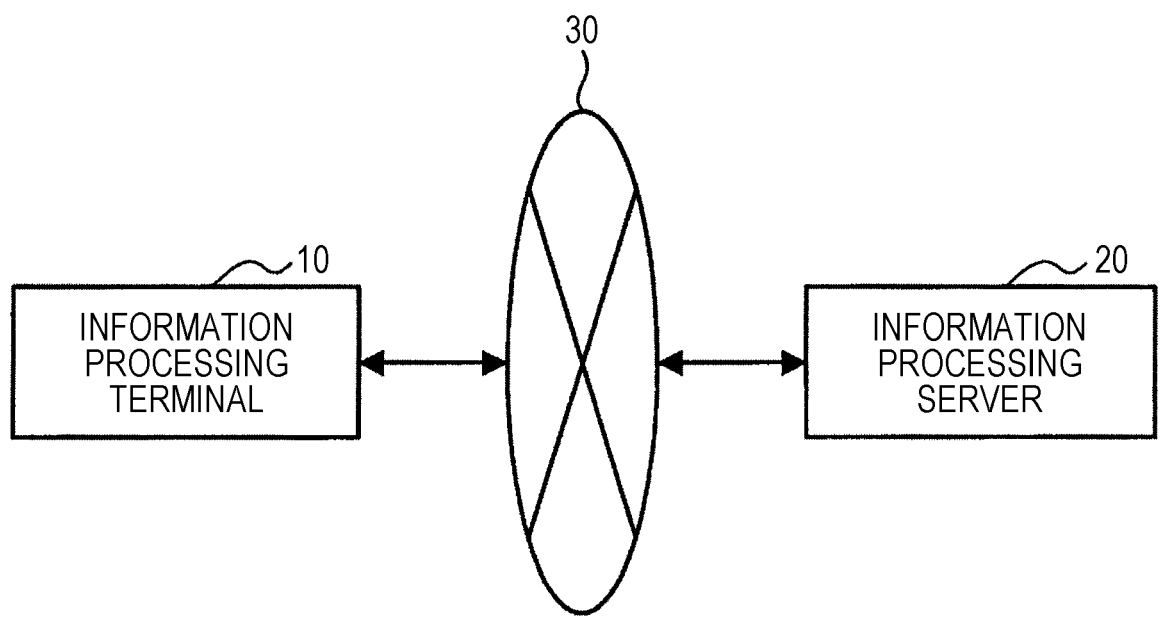
FIG. 1 is a diagram illustrating a configuration example of an information processing system according to an embodiment of the present disclosure.

Preferred embodiments of the present disclosure will be described in detail below with reference to the accompanying drawings. Note that in the present specification and the drawings, components having substantially the same functional configuration are designated by the same reference signs and the same description is not repeated.

Note that the description will be given in the following order.

1. First Embodiment
1.1. Background
1.2. System Configuration Example
1.3. Functional Configuration Example of Information Processing Terminal 10
1.4. Functional Configuration Example of Information Processing Server 20
1.5. Details of Functions
2. Second Embodiment
2.1. Re-encryption Processing
2.2. System Configuration Example
2.3. Functional Configuration Example of Information Processing Terminal 10
2.4. Functional Configuration Example of Information Processing Server 20
2.5. Details of Functions
3. Hardware configuration example
4. Conclusion 1. First Embodiment 1.1. Background First, the background of one embodiment of the present disclosure will be described. As described above, in recent years, with the spread of cloud service and the like, situations where data of individuals and companies is stored on a server managed by a service provider are increasing. Furthermore, a general server protects user data by a method such as encryption of a database.

However, for example, in a case where data is encrypted and indices are created on the server side as described in Patent Document 1, in a case where data is intercepted when the data is transmitted from a client, or in a case where data is illegally acquired from the server before encryption, data in a plain text is leaked.

Furthermore, in general cloud services, the decryption key for decrypting data may also be managed by the server, and any authorized service administrator or service vendor can use the decryption key to decrypt user data. In order to prevent such a situation, it is important to control the user data stored on the server such that the user data can be decrypted only by the user terminal used by the user.

Here, as a method for realizing the above-described control, for example, encryption of user data on the client side can be mentioned. A user transmits encrypted data encrypted with a unique key of the user managed by a client terminal (hereinafter, also referred to as a unique key) to the server and stores the encrypted data, and when decrypting, the user can decrypt the above-described encrypted data described above downloaded from the server using the unique key.

According to the above-described client-side encryption technique, a plain text is never exposed during communication and processing/storage on the server, so that a more secure search system can be achieved. Furthermore, according to the encryption technique, the decryption key is not managed on the server. Thus, it is possible to prevent unauthorized data acquisition by the service administrator or the like as described above.

However, as described above, when indices for search are created on the client side, it is expected that the dictionary used for creating indices becomes bloated, which may be a big load on the processing on the client side. Furthermore, for example, in order to deal with new words and the like, it is required to update the above-described dictionary frequently, and the communication cost for updating the dictionary and the like may increase.

The technical idea related to the present disclosure has been conceived by paying attention to the above-described points, and reduces the processing load and also achieves a more secure searchable encryption technique by causing the client and the server to share word division necessary for index creation.

For this purpose, an information processing terminal 10 according to an embodiment of the present disclosure includes an encryption unit 130 that performs a homomorphic hash operation using a first sharing key on division candidates of words included in a document to be searched for to calculate a first hash value, and a communication unit 170 that transmits the first hash value to an information processing server 20.

Furthermore, the information processing server 20 according to the embodiment of the present disclosure includes a terminal communication unit 240 that receives the first hash value from the information processing terminal 10, and a dividing unit 210 that performs a homomorphic hash operation on the received hash value using a second sharing key corresponding to the first sharing key and determines division units of words used for document search on the basis of matching between the calculated second hash value and an encryption dictionary 236.

Hereinafter, the functions of the information processing terminal 10 and the information processing server 20 according to the embodiment of the present disclosure and the effects of the functions will be described in detail.

1.2. System Configuration Example

First, a configuration example of an information processing system according to the embodiment of the present disclosure will be described. FIG. 1 is a diagram illustrating a configuration example of an information processing system according to a first embodiment. Referring to FIG. 1, the information processing system according to the first embodiment includes the information processing terminal 10 and the information processing server 20. Furthermore, the information processing terminal 10 and the information processing server 20 are connected via a network 30 so that they can communicate with each other.

(Information Processing Terminal 10)

The information processing terminal 10 according to the first embodiment is an information processing device used by a user who searches for a document and the like. The information processing terminal 10 may be, for example, a personal computer (PC), a smartphone, a tablet, or the like.

The information processing terminal 10 according to the first embodiment encrypts a document to be searched for and indices used for searching for the document with a unique key of the user, and then transmits the resultant to the information processing server 20 and registers the resultant. Furthermore, after the encrypted document and the encrypted index are registered, the information processing terminal 10 encrypts search keywords input by the user and transmits the resultant to the information processing server 20, and acquires search result corresponding to the search keywords.

(Information Processing Server 20)

The information processing server 20 according to the first embodiment is an information processing device that stores the encrypted document and the encrypted index received from the information processing terminal 10. Furthermore, the information processing server 20 according to the first embodiment searches for a document on the basis of the encrypted keywords and the encrypted index received from the information processing terminal 10, and transmits the search result to the information processing terminal 10.

(Network 30)

The network 30 has a function of connecting the information processing terminal 10 and the information processing server 20. The network 30 may include a public network such as the Internet, a telephone line network, a satellite communication network, various local area networks (LANs) including Ethernet (registered trademark), a wide area network (WAN), and the like. Furthermore, the network 30 may include a dedicated network such as Internet protocol-virtual private network (IP-VPN). Furthermore, the network 30 may include a wireless communication network such as Wi-Fi (registered trademark) and Bluetooth (registered trademark).

The configuration example of the information processing system according to the embodiment of the present disclosure has been described. Note that the configuration described above with reference to FIG. 1 is merely an example, and the configuration of the information processing system according to the first embodiment is not limited to the example. The configuration of the information processing system according to the first embodiment can be flexibly modified according to specifications and operations.

1.3. Functional Configuration Example of Information Processing Terminal 10

Figure 2:
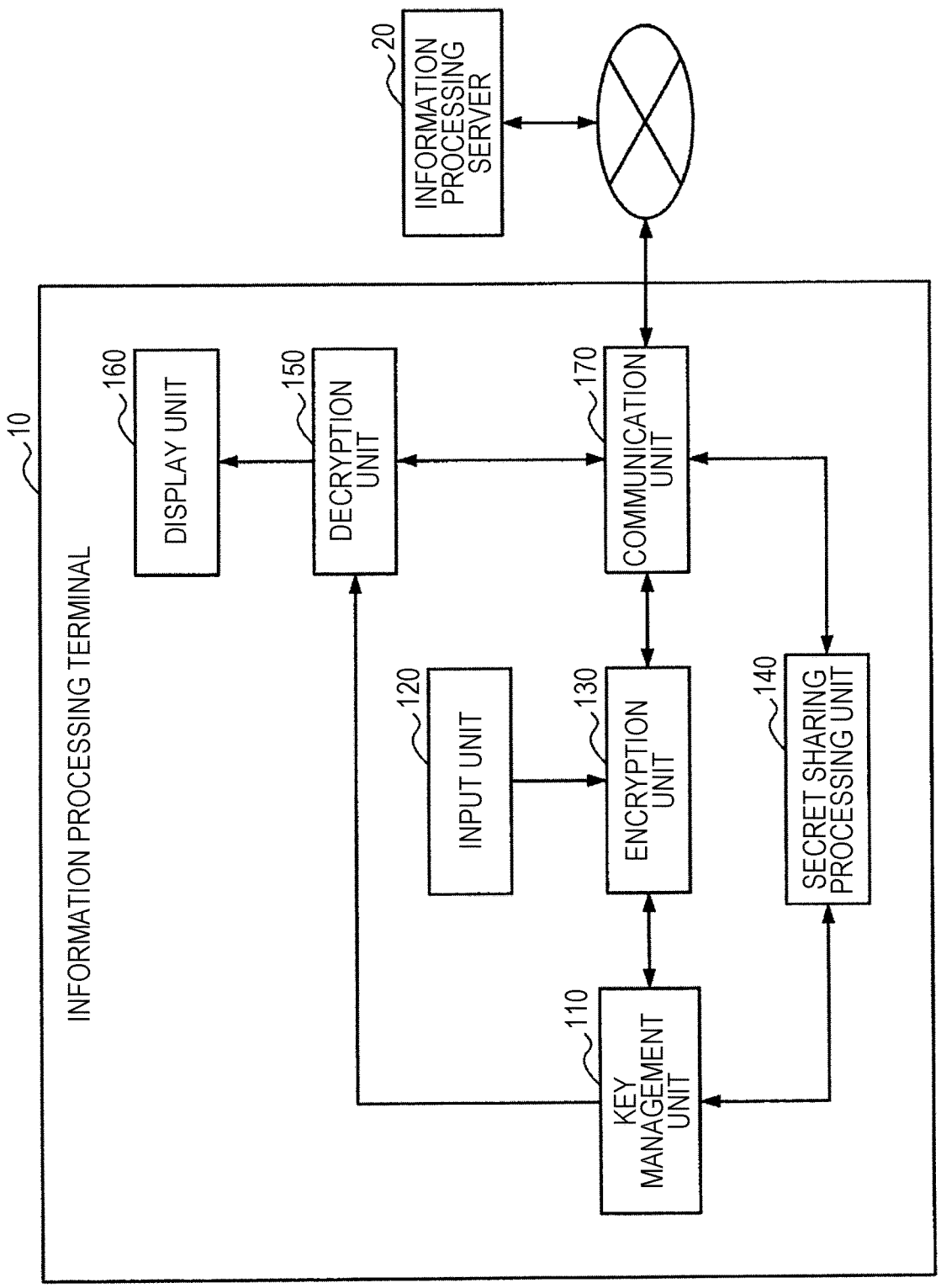
FIG. 2 is a block diagram illustrating a functional configuration example of the information processing terminal according to a first embodiment.

Next, a functional configuration example of the information processing terminal 10 according to the embodiment of the present disclosure will be described in detail. FIG. 2 is a block diagram illustrating a functional configuration example of the information processing terminal 10 according to the first embodiment. Referring to FIG. 2, the information processing terminal 10 according to the first embodiment includes a key management unit 110, an input unit 120, the encryption unit 130, a secret sharing processing unit 140, a decryption unit 150, a display unit 160, and a communication unit 170.

(Key Management Unit 110)

The key management unit 110 according to the first embodiment stores a unique key of a user, a common key received from the information processing server 20, a secret sharing piece (also referred to as a sharing key) generated by the secret sharing processing unit 140, and the like.

(Input Unit 120)

The input unit 120 according to the first embodiment detects various input operations by a user. The input unit 120 according to the first embodiment detects, for example, an input of search keywords, a document registration operation, and the like by a user. Therefore, the input unit 120 according to the first embodiment includes a keyboard, a mouse, various buttons, and the like.

(Encryption Unit 130)

The encryption unit 130 according to the first embodiment encrypts a document and an index. Furthermore, the encryption unit 130 according to the first embodiment creates division candidates for words included in the document, performs a homomorphic hash operation on the division candidates, and the like. The details of the function of the encryption unit 130 according to the first embodiment will be described later.

(Secret Sharing Processing Unit 140)

The secret sharing processing unit 140 according to the first embodiment generates a sharing key by the secret sharing processing. The secret sharing processing unit 140 according to the first embodiment performs secret sharing processing on the common key having been used for encryption of words registered in the encryption dictionary 236 included in the information processing server 20, for example, to generate the first sharing key and the second sharing key. The details of the function of the secret sharing processing unit 140 according to the first embodiment will be described later.

(Decryption Unit 150)

The decryption unit 150 according to the first embodiment decrypts encrypted data. The decryption unit 150 according to the first embodiment decrypts, for example, the search result received from the information processing server 20.

(Display Unit 160)

The display unit 160 according to the first embodiment outputs visual information such as an image or a text. The display unit 160 according to the first embodiment includes a user interface for inputting input data such as search keywords and displaying a search result, for example.

(Communication Unit 170)

The communication unit 170 according to the first embodiment performs information communication with the information processing server 20 via the network 30. The communication unit 170 according to the first embodiment transmits, for example, an encrypted document and an encrypted index to the information processing server 20. Furthermore, the communication unit 170 transmits, for example, encrypted keywords to the information processing server 20, and receives a search result corresponding to the encrypted keywords from the information processing server 20.

The functional configuration example of the information processing terminal 10 according to the embodiment of the present disclosure has been described above. Note that the configuration described above with reference to FIG. 2 is merely an example, and the functional configuration of the information processing terminal 10 according to the first embodiment is not limited to the example. The functional configuration of the information processing terminal 10 according to the first embodiment can be flexibly modified according to specifications and operations.

1.4. Functional Configuration Example of Information Processing Server 20

Figure 3:
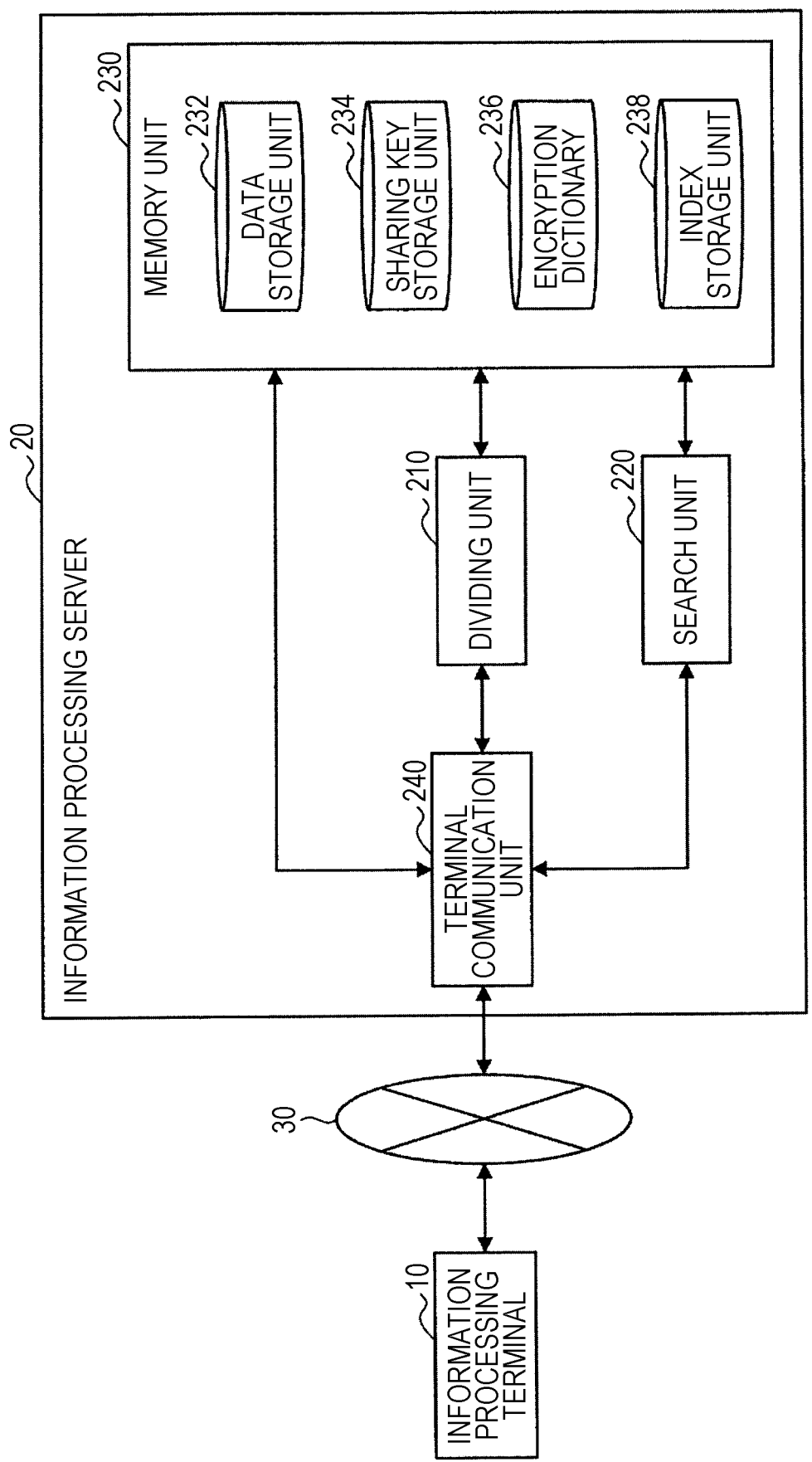
FIG. 3 is a block diagram illustrating a functional configuration example of an information processing server according to the first embodiment.

Next, a functional configuration example of the information processing server 20 according to the embodiment of the present disclosure will be described in detail. FIG. 3 is a block diagram illustrating a functional configuration example of the information processing server 20 according to the first embodiment. Referring to FIG. 3, the information processing server 20 according to the first embodiment includes the dividing unit 210, a search unit 220, a memory unit 230, and the terminal communication unit 240.

(Dividing Unit 210)

The dividing unit 210 according to the first embodiment determines division units of words used for document search by morphological analysis using the encryption dictionary 236. The details of the function of the dividing unit 210 according to the first embodiment will be described later.

(Search Unit 220)

The search unit 220 according to the first embodiment searches for a document on the basis of the encrypted keywords received from the information processing terminal 10 and the encrypted index stored in an index storage unit 238.

(Memory Unit 230)

The memory unit 230 according to the first embodiment stores various types of information related to document search. The memory unit 230 according to the first embodiment includes a data storage unit 232, a sharing key storage unit 234, an encryption dictionary 236, an index storage unit 238, and the like.

(Data Storage Unit 232)

The data storage unit 232 according to the first embodiment stores various types of encrypted data such as an encrypted document received from the information processing terminal 10.

(Sharing Key Storage Unit 234)

The sharing key storage unit 234 according to the first embodiment stores the sharing key received from the information processing terminal 10. Furthermore, the sharing key storage unit 234 according to the first embodiment stores information of the information processing terminal 10 and the user, which are the generation source of the sharing key, together with the sharing key.

(Encryption Dictionary 236)

The encryption dictionary 236 according to the first embodiment is a dictionary used by the dividing unit 210 for morphological analysis. In the encryption dictionary 236 according to the first embodiment, a plurality of words encrypted with a common key common to all users is registered.

(Index Storage Unit 238)

The index storage unit 238 according to the first embodiment stores the encrypted index received from the information processing terminal 10.

(Terminal Communication Unit 240)

The terminal communication unit 240 according to the first embodiment performs information communication with the information processing terminal 10 via the network 30. The terminal communication unit 240 according to the first embodiment receives, for example, an encrypted document and an encrypted index from the information processing terminal 10. Furthermore, the terminal communication unit 240 receives encrypted keywords from the information processing terminal 10, and transmits the search result acquired by the search unit 220 to the information processing terminal 10, for example.

The functional configuration example of the information processing server 20 according to the embodiment of the present disclosure has been described above. Note that the configuration described above with reference to FIG. 3 is merely an example, and the functional configuration of the information processing server 20 according to the first embodiment is not limited to the example. For example, the function of the search unit 220 according to the first embodiment may be implemented by a separate search device. The functional configuration of the information processing server 20 according to the first embodiment can be flexibly modified according to specifications and operations.

1.5. Details of Functions

Next, the functions of the information processing terminal 10 and the information processing server 20 according to the first embodiment will be described in detail. As described above, the information processing method according to the first embodiment reduces the processing load and achieves a more secure searchable encryption technique by causing the client and the server to share word division required for index creation.

More specifically, in the information processing method according to the first embodiment, first, the encryption unit 130 of the information processing terminal 10 creates division candidates for words included in a document to be searched for, encrypts the division candidates, and the encrypted division candidates are transmitted to the information processing server.

Next, the dividing unit 210 of the information processing server 20 matches the encrypted division candidates with the encryption dictionary 236, and creates a lattice structure necessary for morphological analysis.

Subsequently, the dividing unit 210 determines the optimum division units of words for document search on the basis of the weight information on the lattice structure.

Next, the encryption unit 130 of the information processing server 20 creates an index for full-text search for the document on the basis of the above-described division units, encrypts the index, and registers the encrypted index in the information processing server 20.

According to the above-described processing, it becomes possible to securely perform the full-text search of the encrypted document using the registered encrypted index. Furthermore, according to the information processing method according to the first embodiment, it is possible to create a situation in which a plain text is not exposed at all on the information processing server 20 by using the searchable encryption technique, and it is also possible to prevent unauthorized data acquisition by a service administrator or the like since the decryption key is not managed on the information processing server 20.

Hereinafter, each of pieces of processing included in the information processing method according to the first embodiment will be described in more detail.

First, generation and storage of the sharing key according to the first embodiment will be described.

Figure 4:
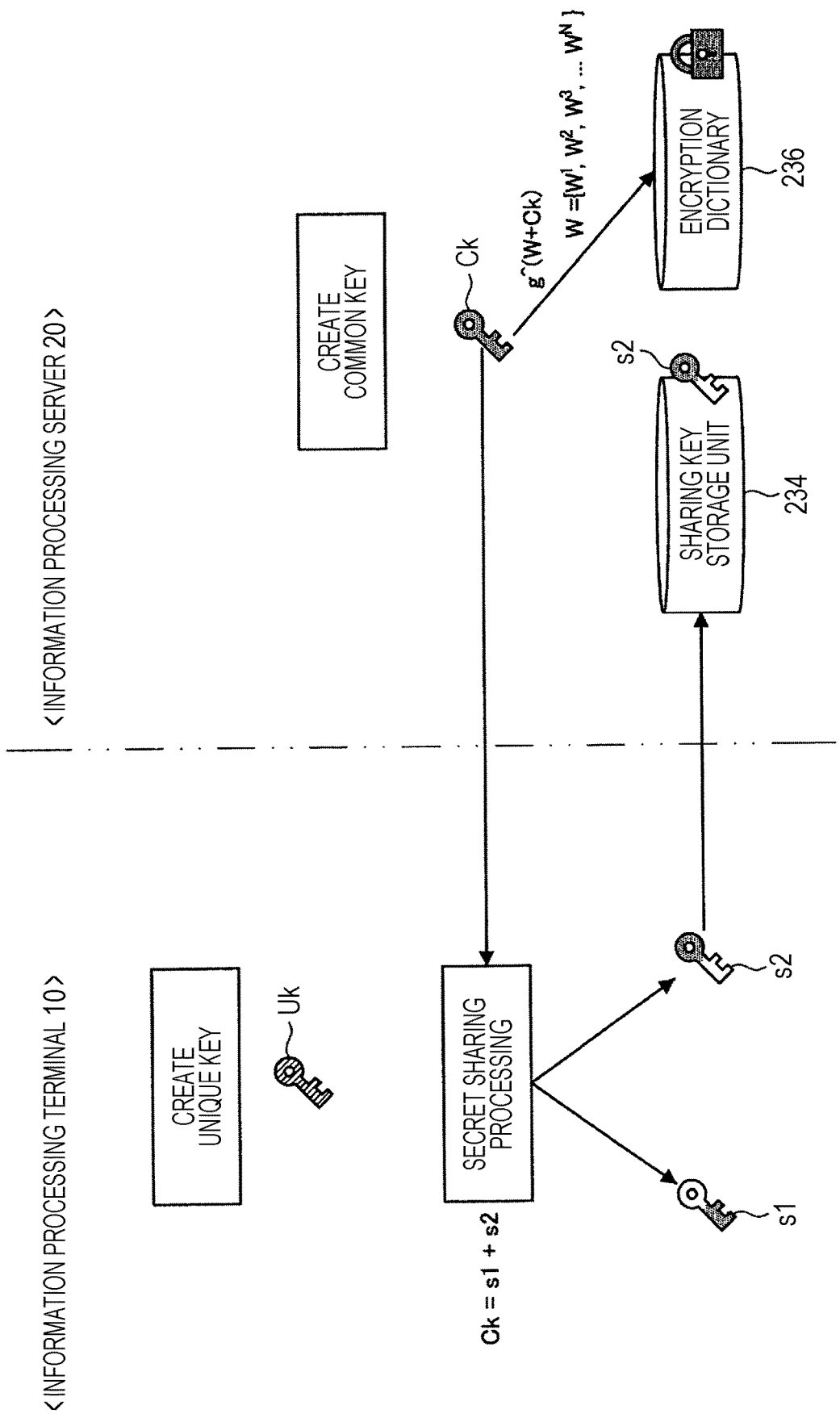
FIG. 4 is a diagram illustrating the flow of the initial setup according to the first embodiment.

FIG. 4 is a diagram illustrating the flow of the initial setup according to the first embodiment. In the initial setup according to the first embodiment, first, a unique key Uk of a user is generated in the information processing terminal 10 and a common key Ck is generated in the information processing server 20.

Here, the common key Ck according to the first embodiment is a key for encrypting words registered in the encryption dictionary 236, and is commonly used by all users.

Next, the secret sharing processing unit 140 of the information processing terminal 10 downloads the common key Ck from the information processing server 20 via the communication unit 170, and performs secret sharing processing on the common key Ck to generate a first sharing key s1 and a second sharing key s2 as two secret sharing pieces. Note that at this time, the first sharing key s1 and the second sharing key s2 to be generated are different for each information processing terminal 10.

Here, the generated first sharing key s1 is stored by the key management unit 110, and the second sharing key s2 is transmitted by the communication unit 170 to the information processing server 20 (search device) and stored in the sharing key storage unit 234.

Figure 5:
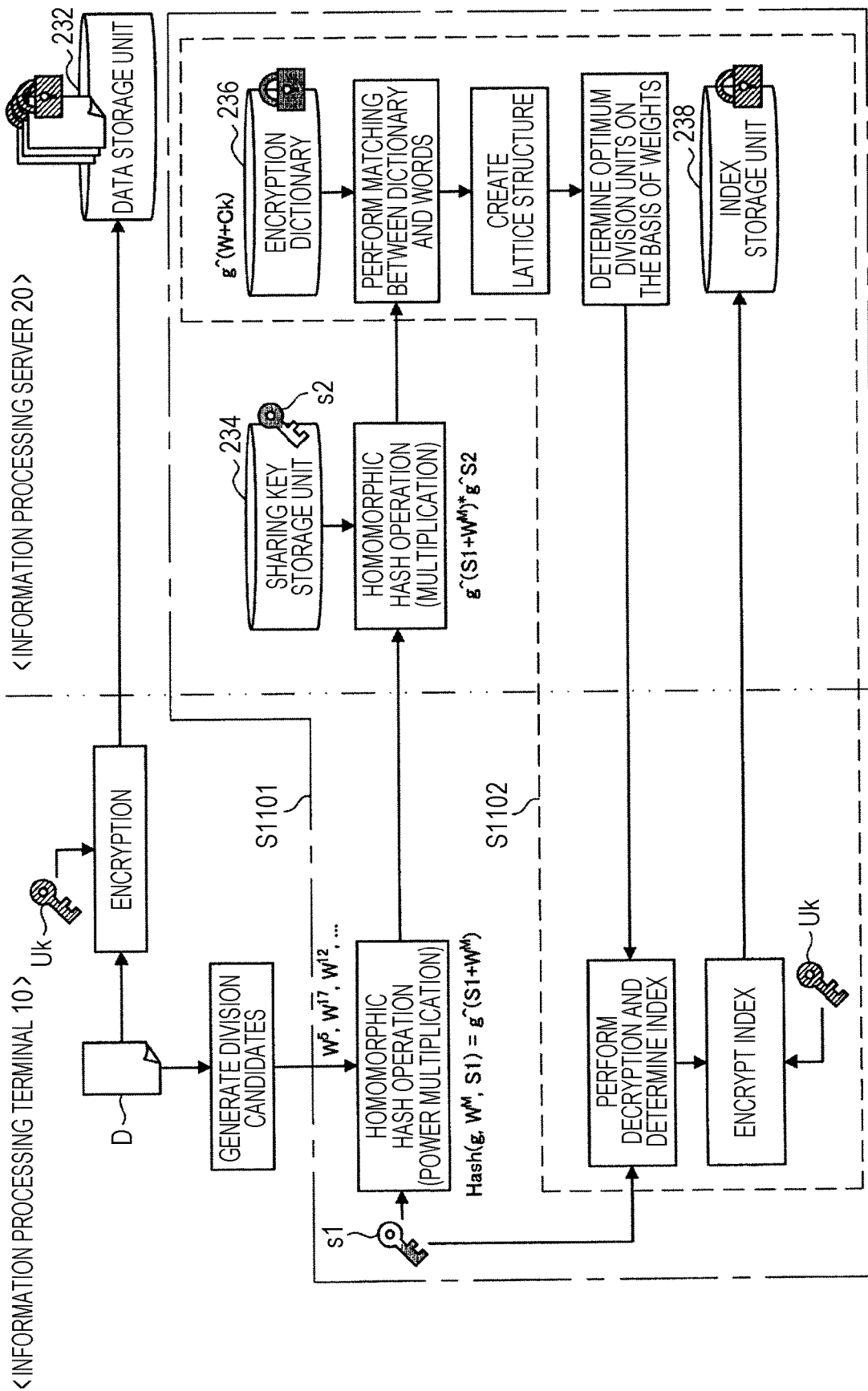
FIG. 5 is a diagram illustrating a flow of encrypted index generation according to the first embodiment.

Next, the generation of the encrypted index according to the first embodiment will be described. FIG. 5 is a diagram illustrating a flow of encrypted index generation according to the first embodiment. Here, first, a document to be searched for is generated by input by a user or the like. The encryption unit 130 encrypts the generated document D using the unique key Uk, and subsequently, the communication unit 170 transmits the encrypted document D to the information processing server 20. Furthermore, the data storage unit 232 of the information processing server 20 stores the encrypted document D received by the terminal communication unit 240. FIG. 8 is an example of a table in which document bodies and document IDs held by the data storage unit 232 according to the first embodiment are stored.

Next, the encryption unit 130 according to the first embodiment generates a plurality of division candidates of words included in the document D. Here, the division accuracy by the encryption unit 130 may be lower than the word division accuracy by the dividing unit 210 of the information processing server 20, which will be described later. Specifically, the encryption unit 130 performs morphological analysis using a simple dictionary having a smaller number of registered words than the encryption dictionary 236 included in the information processing server 20, and generation of division candidates by N-Gram.

A dictionary is required for morphological analysis. However, at this time, the dictionary may become bloated in order to deal with new words and technical terms, which may be a big load on the processing of the information processing terminal 10. Therefore, the encryption unit 130 according to the first embodiment may reduce the processing load by performing morphological analysis using a simple dictionary having a smaller number of registered words than the encryption dictionary 236.

Furthermore, in general, N-Gram may divide a document into words that are different from those originally assumed (for example, "国会議事堂 (kokkai gijidou" is divided into "国会 (kokkai)", "会議 (kaigi)", "議事 (giji)", "議事堂 (gijidou)", etc.), but in the first embodiment, the final division units are determined by the morphological analysis performed by the dividing unit 210 of the information processing server 20 using the encryption dictionary 236. Thus, when the encryption unit 130 generates the division candidates, processing efficiency may be prioritized without seeking accuracy.

Subsequently, the encryption unit 130 performs a homomorphic hash operation (power multiplication) using the first sharing key s1 on all of the generated division candidates to calculate a first hash value. Furthermore, the communication unit 170 transmits the calculated first hash value to the information processing server 20 (also referred to as an external device).

Next, the dividing unit 210 of the information processing server 20 performs a homomorphic hash operation (multiplication) using a corresponding second sharing key s2 on the first hash value received by the terminal communication unit 240 from the information processing terminal 10 (also referred to as a terminal) to calculate a second hash value.

Subsequently, the dividing unit 210 determines the division units of words used for document search on the basis of the matching between the calculated second hash value and the encryption dictionary 236. More specifically, the dividing unit 210 matches the second hash value (word) with the encryption dictionary 236, and creates a lattice structure on the basis of the matching result. Next, the dividing unit 210 can perform morphological analysis based on the weight of the created lattice structure and determine the division units.

Normally, a dictionary used for morphological analysis has information regarding words, parts of speech, appearance frequencies, likelihoods of connection between words, and the like in order to determine division of responsibility on the basis of the appearance frequencies and numerical values related to the connection between words in a case where there is a plurality of word candidates.

At this time, in a case where encryption is performed for searchable encryption as in the first embodiment, it is required that all of the words included in the dictionary are converted into the ciphertexts by the searchable encryption in advance. However, here, in a case where encryption is performed with a common key, there is a possibility that a word that is being searched for can be grasped by sharing the key. Therefore, in the first embodiment, the common key used for encrypting the encryption dictionary 236 is distributed on the information processing terminal 10 side by secret sharing processing, and the second sharing key s2, which is one of the sharing pieces, is used for dictionary search on the information processing server 20, so that it is possible to prevent the word to be searched for from leaking to other users.

Figure 6:
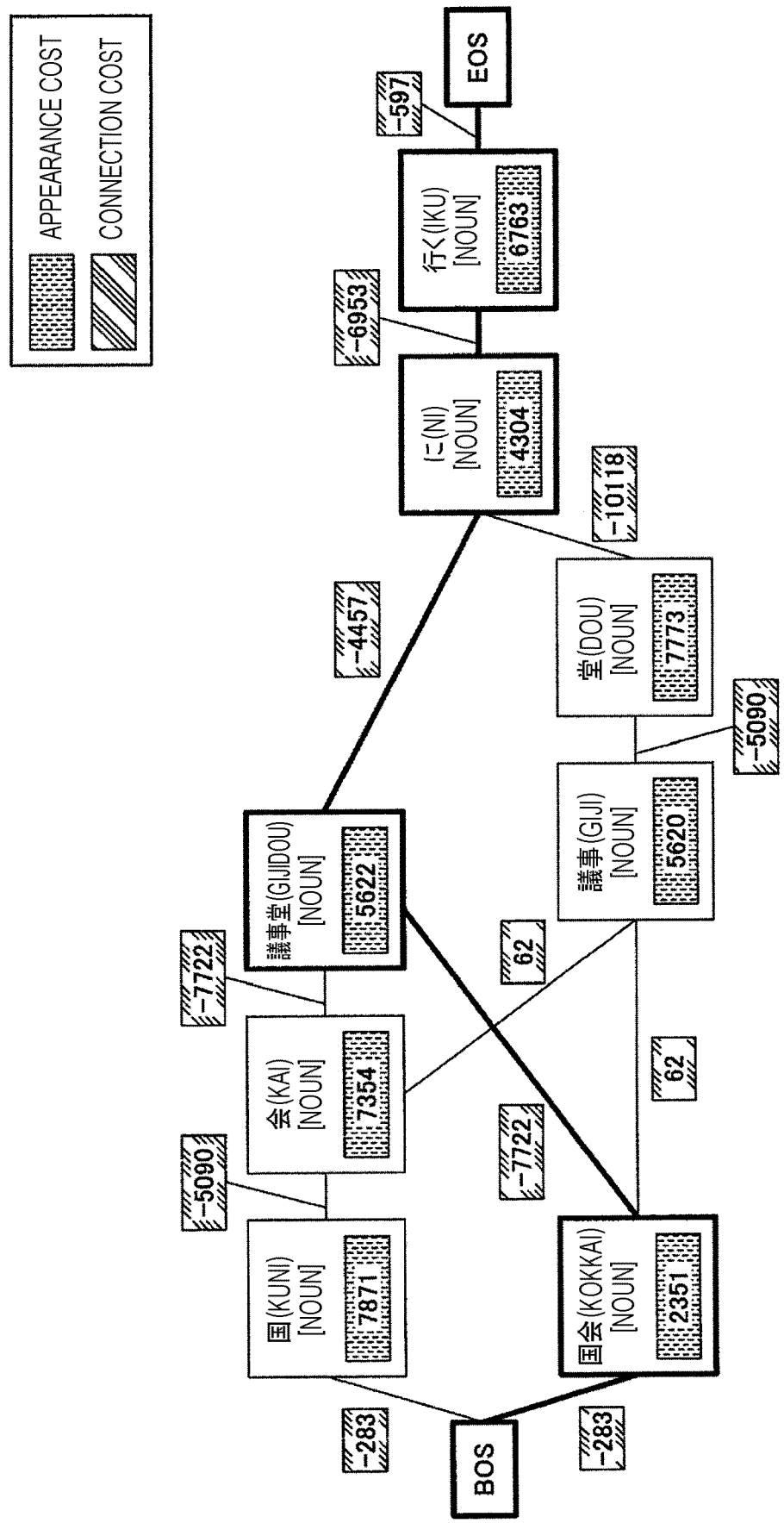
FIG. 6 is an example of a lattice structure created by a dividing unit according to the first embodiment.

FIG. 6 is an example of a lattice structure created by the dividing unit 210 according to the first embodiment. FIG. 6 illustrates an example of a lattice structure for a sentence "国会議事堂に行く (kokkai gijidou ni iku)". The dividing unit 210 according to the first embodiment can create a lattice structure as illustrated in the figure by, for example, matching a word such as "国会 (kokkai)" encrypted by the encryption unit 130 of the information processing terminal 10 with the encryption dictionary 236 and determine parts of speech and the like on the basis of the weights such as appearance costs and the connection costs.

Note that although FIG. 6 illustrates an example of the lattice structure for Japanese, the dividing unit 210 according to the first embodiment can also perform morphological analysis for other languages such as English, for example. For example, for a phrase "I live in New York City", it is desirable to acquire "New York City" in a connected state since "New York City" is a proper noun. In this case, registration of the proper noun "New York City" in the encryption dictionary 236 in advance enables division into units of, "I", "live", "in", and "New York City" that are optimum for document search.

Note that, in the case where "New York City" is registered in the encryption dictionary 236 as a proper noun, the dividing unit 210 may include the abbreviations "NY" and "NYC" in the division units as related words.

The flow of encrypted index generation will be described again with reference to FIG. 5. When the division units are determined by the dividing unit 210, the terminal communication unit 240 transmits encrypted information related to the determined division units to the information processing terminal 10. Here, the above-described encrypted information related to the division units may be data obtained by all of the divided words that are encrypted.

Next, the decryption unit 150 of the information processing terminal 10 decrypts the encrypted information received by the communication unit 170 to determine the index for the document D.

Next, the encryption unit 130 encrypts the determined index using the unique key Uk to generate an encrypted index. Subsequently, the communication unit 170 transmits the generated encrypted index to the information processing server 20. Furthermore, the index storage unit 238 of the information processing server 20 stores the encrypted document D received by the terminal communication unit 240. FIG. 7 is an example of a table indicating association between the encrypted indices and documents, which are held by the index storage unit 238 according to the first embodiment. In the case of the example illustrated in FIG. 7, it can be seen that, for example, the word $W^9$ is contained in document A and document B, and the word W11 is contained in document A, document B, and document C.

Figure 9:
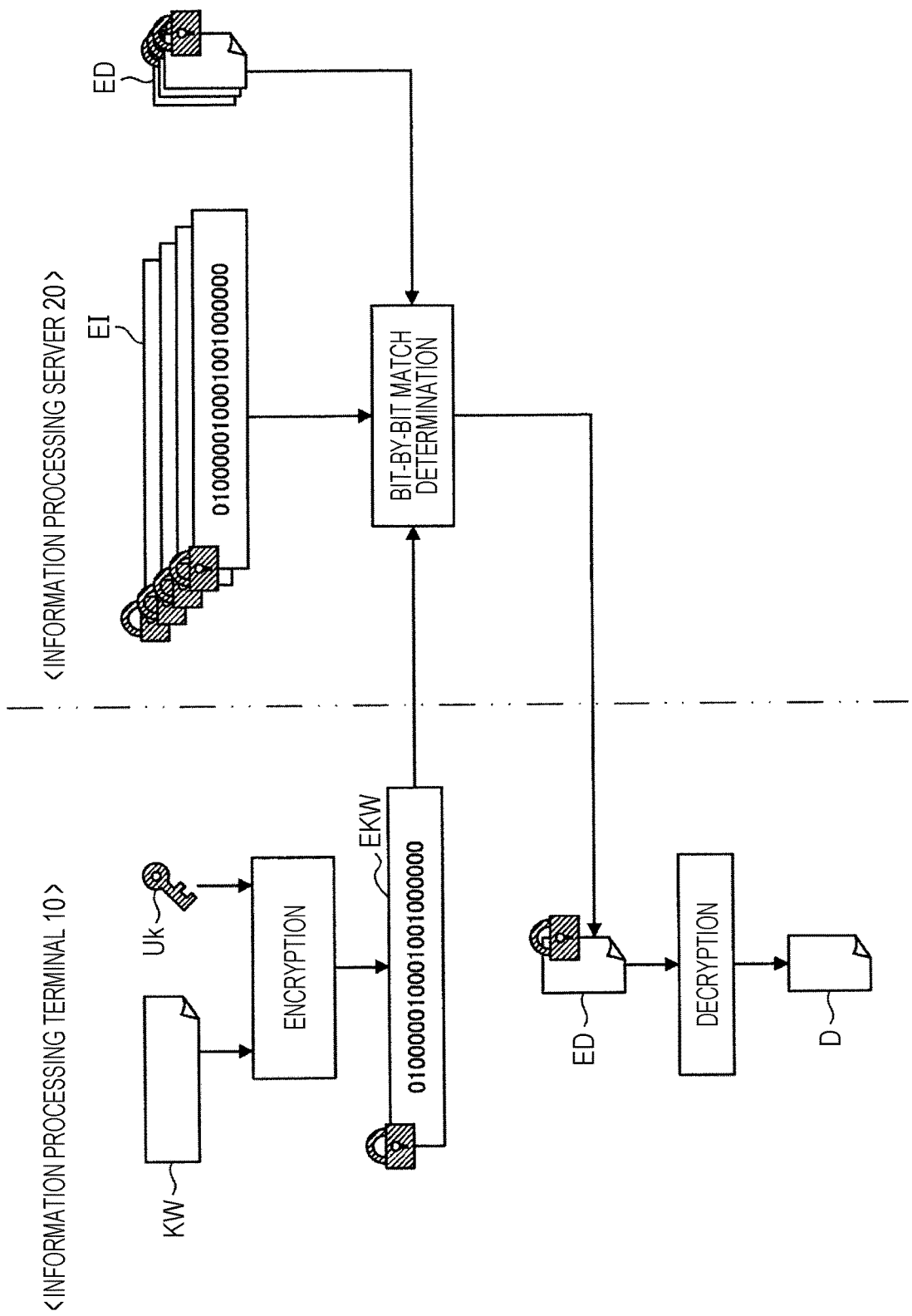
FIG. 9 is a diagram for describing search for an encrypted document according to the first embodiment.

The flow of encrypted index generation according to the first embodiment has been described above. Next, a search for an encrypted document using the encrypted index generated as described above will be described. FIG. 9 is a diagram for describing a search for an encrypted document according to the first embodiment.

First, the encryption unit 130 of the information processing terminal 10 encrypts a search keyword input by a user using the unique key Uk, and generates an encrypted keyword EKW. The encryption unit 130 according to the first embodiment converts the search keyword into a hash value by a homomorphic hash operation, and encodes (maps) the hash value into an approximate membership query (AMQ) format such as a Bloom filter or a counting filter, for example, to generate an encrypted keyword.

At this time, in a case where the input search keyword is a single one or an AND search using a plurality of search keywords is performed, the encryption unit 130 maps the hash value to a single Bloom filter, for example. On the other hand, in a case of an OR search using a plurality of search keywords, the encryption unit 130 may map the hash value to a Bloom filter in unit of OR, for example.

The communication unit 170 transmits the encrypted keyword EKW generated by the encryption unit 130 to the information processing server 20.

Next, the search unit 220 of the information processing server 20 performs a document search on the basis of the encrypted keyword EKW received from the information processing terminal 10 and the plurality of encrypted indices EI stored in the index storage unit 238. Specifically, the search unit 220 can perform a search by performing a bit-by-bit match determination between the encrypted keyword EKW and the encrypted indices EI. Note that the encrypted indices EI according to the first embodiment may be ones that are mapped to a Bloom filter or the like similarly to the encrypted keyword EKW.

Here, in a case where there is an encrypted index EI that includes an encrypted index EKW, the search unit 220 can identify a corresponding encrypted document on the basis of a table as illustrated in FIG. 7. For example, in a case where the encrypted keyword EKW is the word $W^{11}$, the search unit 220 may return to the information processing terminal 10 via the terminal communication unit 240, as a search result, that document A, document B, and document C are documents to be searched for. On the other hand, the search unit 220 may return document A, document B, and document C themselves as the search result. In the example illustrated in FIG. 9, the search unit 220 returns the corresponding encrypted document ED itself as a search result to the information processing terminal 10.

In this case, the decryption unit 150 of the information processing terminal 10 can decrypt the encrypted document ED, which is the search result received by the communication unit 170, to acquire the plain text document D.

The processing flow by the information processing terminal 10 and the information processing server 20 according to the first embodiment has been described above. As described above, according to the information processing method according to the first embodiment, it is possible to create a situation in which a plain text is not exposed at all on the information processing server 20 by using the searchable encryption technique, and it is also possible to prevent unauthorized data acquisition by a service administrator or the like since the decryption key is not managed on the information processing server 20.

Note that in the above description, the case where a document is searched for has been mainly described as an example, but the information processing method according to the first embodiment can be applied to data other than a document. The information processing method according to the first embodiment may be used, for example, for searching for a voice memo. According to the information processing method according to the first embodiment, voice recognition is performed on the recorded voice data, and a search index is created on the basis of the result of the voice recognition so that voice data can be searched for more securely.

At this time, as a configuration for implementing the above-described voice recognition, a case where the voice recognition is performed on the information processing terminal 10 side and a case where the voice recognition is performed on the information processing server 20 side are assumed.

Figure 10:
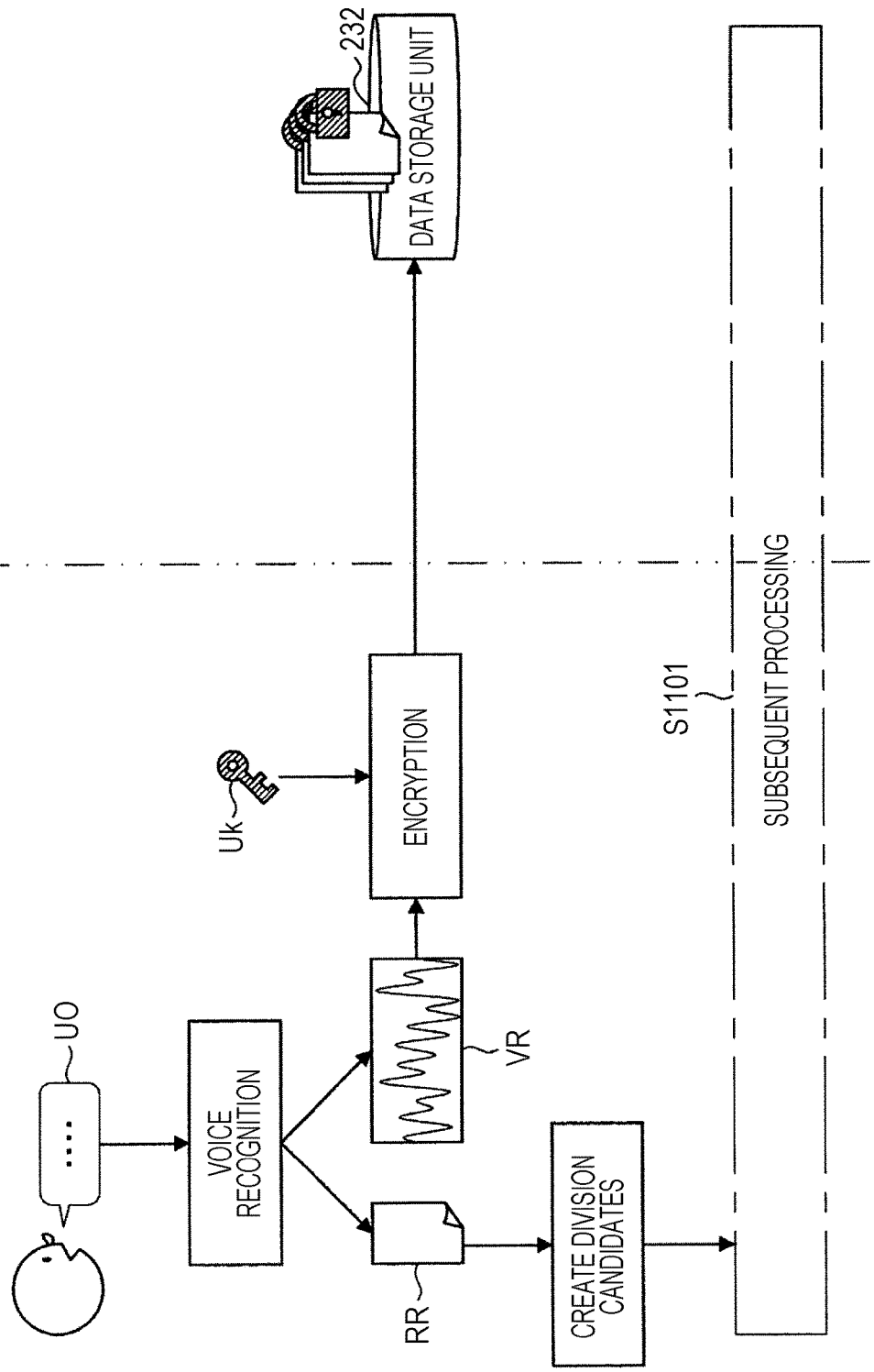
FIG. 10 is a diagram illustrating a flow of a case where voice recognition is performed on the information processing terminal side in voice data search according to the first embodiment.

FIG. 10 is a diagram illustrating a flow of a case where voice recognition is performed on the information processing terminal 10 side in the voice data search according to the first embodiment. In this case, first, a voice recognition unit included in the information processing terminal 10 performs voice recognition on a user's speech UO, and generates a voice recognition result RR and voice data VR. Next, the encryption unit 130 encrypts the voice data VR using the unique key Uk, and the communication unit 170 transmits the encrypted voice data VR to the information processing server 20. The data storage unit 232 of the information processing server 20 stores the encrypted voice data VR received by the terminal communication unit 240.

Furthermore, the information processing terminal 10 and the information processing server 20 according to the first embodiment perform processing of generating encrypted indices on the basis of the voice recognition result RR in parallel with the above-described processing. The information processing terminal 10 and the information processing server 20 can generate an encrypted index by performing the subsequent processing illustrated as step S1101 of FIG. 5 on the division candidates generated from the voice recognition result RR.

Figure 11:
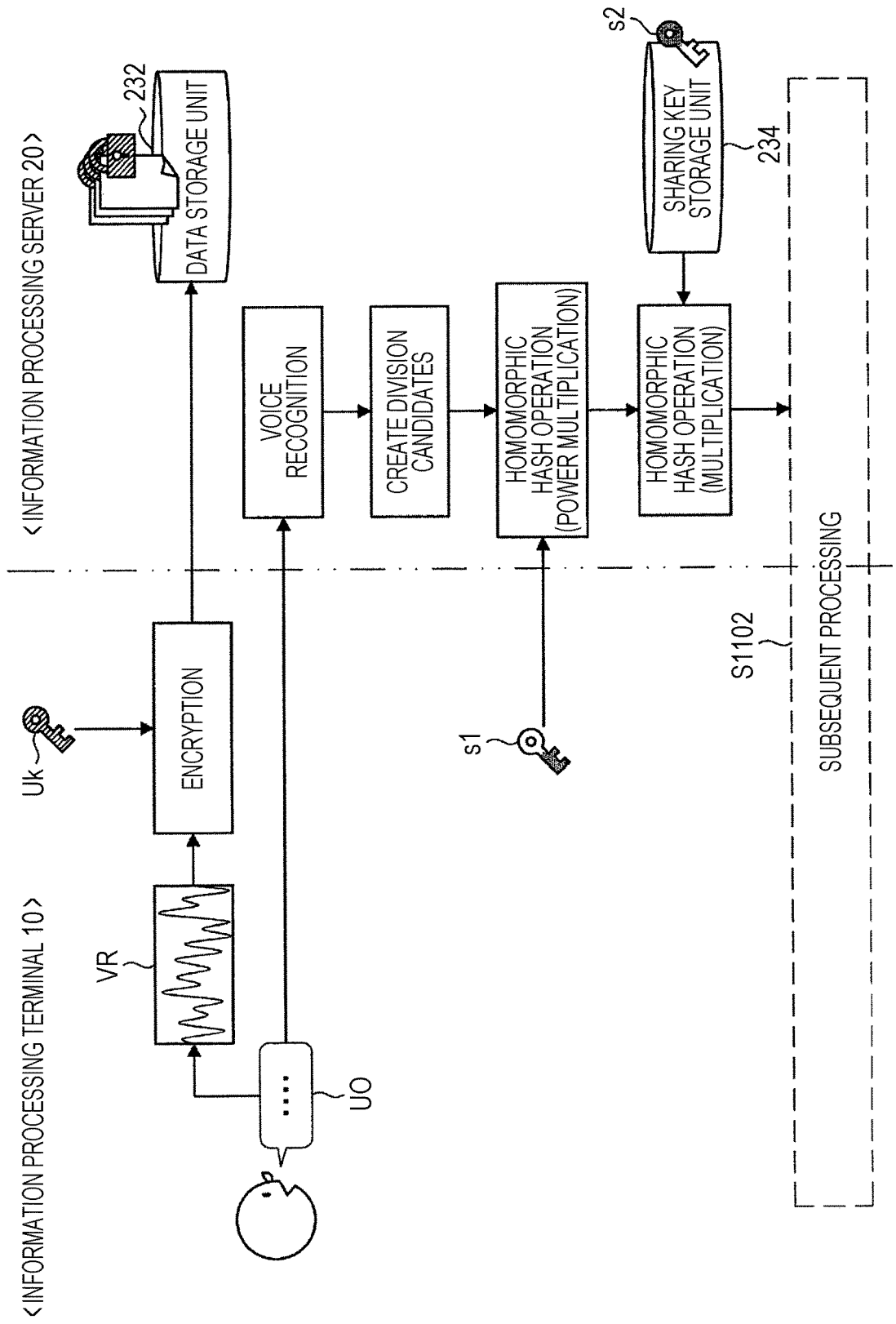
FIG. 11 is a diagram illustrating a flow of a case where voice recognition is performed on the information processing server side in voice data search according to the first embodiment.

On the other hand, FIG. 11 is a diagram illustrating a flow of a case where voice recognition is performed on the information processing server 20 side in the voice data search according to the first embodiment. In this case, first, the encryption unit 130 of the information processing terminal 10 encrypts, using the unique key, the voice data VR obtained by recording a user's speech UO, and the communication unit 170 transmits the encrypted voice data VR to the information processing server 20. The data storage unit 232 of the information processing server 20 stores the encrypted voice data VR received by the terminal communication unit 240.

Similarly, in this case as well, the information processing terminal 10 and the information processing server 20 perform processing of generating the encrypted indices in parallel. First, the voice recognition unit included in the information processing server 20 performs voice recognition processing on the user's speech UO to acquire the voice recognition result RR. Next, the dividing unit 210 of the information processing server 20 creates division candidates from the voice recognition result RR. Subsequently, the dividing unit 210 performs a homomorphic hash operation on the division candidates using the first divided key s1 temporarily acquired from the information processing terminal 10, and performs a homomorphic hash operation on the division candidates using the second divided key s2 stored in the sharing key storage unit 234. After the above-described processing, the information processing server 20 and the information processing terminal 10 can generate an encrypted index by performing the subsequent processing illustrated as step S1102 of FIG. 5.

As described above, according to the information processing method according to the first embodiment, it is possible to more securely search for not only text data but also voice data.

Furthermore, the information processing method according to the first embodiment can be applied to, for example, password management of Web services. In recent years, a wide variety of Web services have been developed, but for users who use a plurality of Web services, adverse effects such as not being able to remember passwords may occur.

Therefore, the information processing method according to the first embodiment can achieve secure password management by setting, as a search target, a password, a user ID, a URL, a site name, or the like that is used for a Web service.

Specifically, a user encrypts a password, a user ID, a URL, a site name, or the like instead of the document D in the processing flow illustrated in FIG. 5, and registers the encrypted data in the information processing server 20. Next, the information processing server 20 and the information processing terminal 10 illustrated in FIG. 5 perform processing of generating encrypted indices based on the above-described information, and the information processing server 20 stores the encrypted indices.

According to the above-described processing, only the user having the unique key Uk can search for the password using the user ID, the URL, the site name, and the like, so that secure password management can be achieved.

Furthermore, for example, by registering patterns that are inappropriate as a password (for example, abc123) in the encryption dictionary 236, it is possible to prevent a weak password from being registered, which can further improve security.

The application example of the information processing method according to the first embodiment to data other than document search has been described above. As described above, the information processing method according to the first embodiment can be flexibly applied to various search services.

Furthermore, the information processing method according to the first embodiment can also support a search by multiple users. For example, it is assumed a case where a search operation on a document registered by a user is desired to be authorized only to a specific user other than the user who registered. However, in a case where the unique key used for data encryption is shared with other users, identity theft or the like becomes possible, which lowers the security. Therefore, in the information processing method according to the first embodiment, the unique key used for encrypting data such as a document is distributed by secret sharing processing, and one sharing piece is distributed to another user, and the other sharing piece is stored in the information processing server 20, so that sharing of search by multiple users can be achieved securely.

Figure 12:
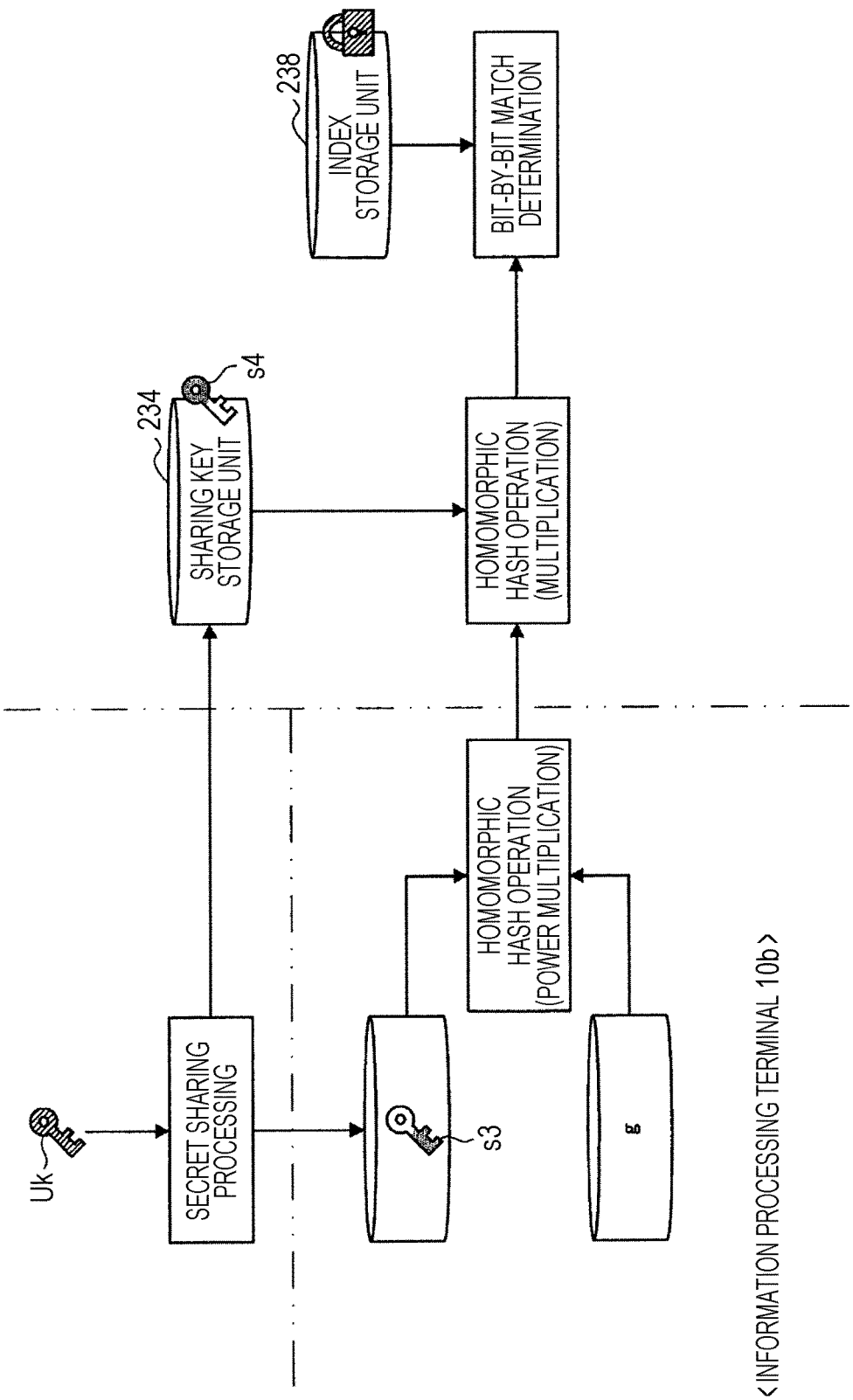
FIG. 12 is a diagram for describing sharing of search by multiple users according to the first embodiment.

FIG. 12 is a diagram for describing sharing of search by multiple users according to the first embodiment. FIG. 12 illustrates an example of a case, in which after a user who owns an information processing terminal 10a registers the encrypted document and the encrypted indices illustrated in FIGS. 4 and 5, the user authorizes a user who owns an information processing terminal 10b to search for the registered encrypted document.

At this time, the secret sharing processing unit 140 of the information processing terminal 10a, which is the sharing source, performs secret sharing processing on the unique key Uk used for generating the encrypted document and the encrypted indices to generate a third sharing key s3 and a fourth sharing key s4. Next, the communication unit 170 transmits the generated third sharing key s3 to the information processing terminal 10b (search authorized device) to be a sharing destination, and transmits the fourth sharing key s4 and the information processing terminal 10 to the information processing server 20 (search device).

After that, in a case where a search is performed by the information processing terminal 10b, which is a sharing destination, the encryption unit 130b of the information processing terminal 10b performs a homomorphic hash operation (power multiplication) using the third sharing key s3 and the homomorphic hash parameter g received from the information processing terminal 10a, and transmits a calculated third hash value to the information processing server 20.

Next, the search unit 220 of the information processing server 20 performs a homomorphic hash operation (multiplication) on the third hash value, which is received by the terminal communication unit 240, using the fourth sharing key s4 that is received from the information processing terminal 10a and stored in the sharing key storage unit 234. Subsequently, the search unit 220 executes a search by performing a bit-by-bit match determination between the calculated fourth hash value and the encrypted indices stored in the index storage unit 238.

At this time, the search unit 220 may execute a search on the basis of a table indicating the correspondence between owners of documents (sharing source users) and users who are authorized to search for the documents (sharing destination user). FIG. 13 is an example of a table indicating the correspondence between sharing source users and the sharing destination users according to the first embodiment.

For example, when the word $W^{11}$ is searched for by using the encrypted indices illustrated in FIG. 7, the documents A, B, and C are the documents to be searched for. Here, referring to FIG. 13, there is no user authorized to search for document A, user β and user γ are authorized to search for document B, user β and user σ are authorized to search for document C. Therefore, the search unit 220 may exclude the existence of document A from the search result and return the search result relating only to document B and document C for the search for the word $W^{11}$ by the user β. Similarly, when user γ searches for the word $W^{11}$, the search unit 220 may exclude the existence of document A and document C from the search result and return the search result relating only to document B.

Thus, according to the sharing of search by multiple users according to the first embodiment, the existence of the document for which sharing is not authorized can be concealed by returning the search result relating only to documents for which sharing is authorized, so that more secure search sharing can be achieved.

2. Second Embodiment

In the first embodiment, an information processing terminal 10 performs secret sharing processing on the common key Ck to generate the first sharing key s1 and the second sharing key s2. Therefore, an information processing server 20 needs to transmit the common key Ck to the information processing terminal 10. In this case, the common key Ck may leak out via the information processing terminal 10.

On the other hand, it is also conceivable that the information processing server 20 performs secret sharing processing on the common key Ck to generate the first sharing key s1 and the second sharing key s2. However, in this case, the first sharing key s1, which should be kept in secret by the information processing terminal 10, is known by the information processing server 20.

Therefore, in the second embodiment, a re-encryption processing mechanism is used so that the common key Ck is prevented from being acquired by the information processing terminal 10. This further improves the safety of the matching method with the dictionary for performing morphological analysis.

2.1. Re-Encryption Processing

Before starting description of the second embodiment, the outline of the re-encryption processing used in the second embodiment will be described. Specifically, the processing of proxy re-encryption will be briefly described.

Figure 14:
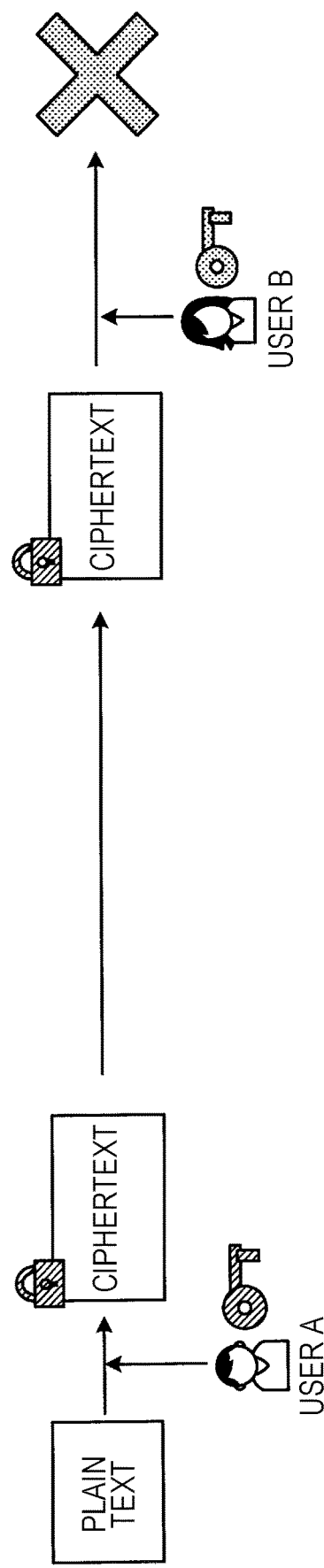
FIG. 14 is a diagram illustrating encryption using a private key.

FIG. 14 is a diagram illustrating encryption using a private key. For example, suppose user A has a ciphertext obtained by encrypting a plain text with his/her private key, as illustrated in FIG. 14. Then, suppose user B wants to obtain the plain text of the ciphertext. In this case, user B cannot decrypt the ciphertext of user A with his/her private key, and therefore cannot obtain the plain text of user A.

Figure 15:
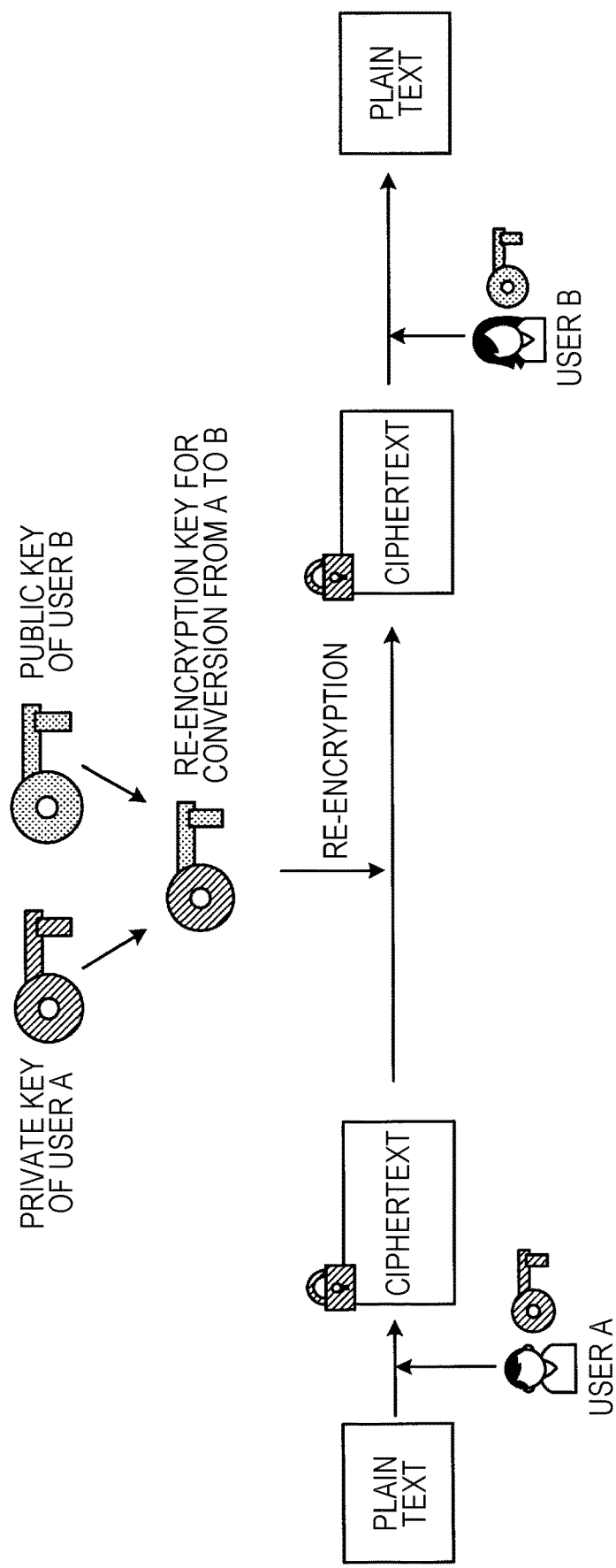
FIG. 15 is a diagram for describing proxy re-encryption processing.

FIG. 15 is a diagram for describing proxy re-encryption processing. In proxy re-encryption, a re-encryption key is generated using the private key of user A and a public key of user B. In proxy re-encryption, the ciphertext obtained by encryption with the public key of user A is encrypted with the re-encryption key. Therefore, a ciphertext obtained by encryption with the public key of user B is created. User B can obtain the plain text of User A by decrypting the ciphertext with his/her private key.

Figure 16:
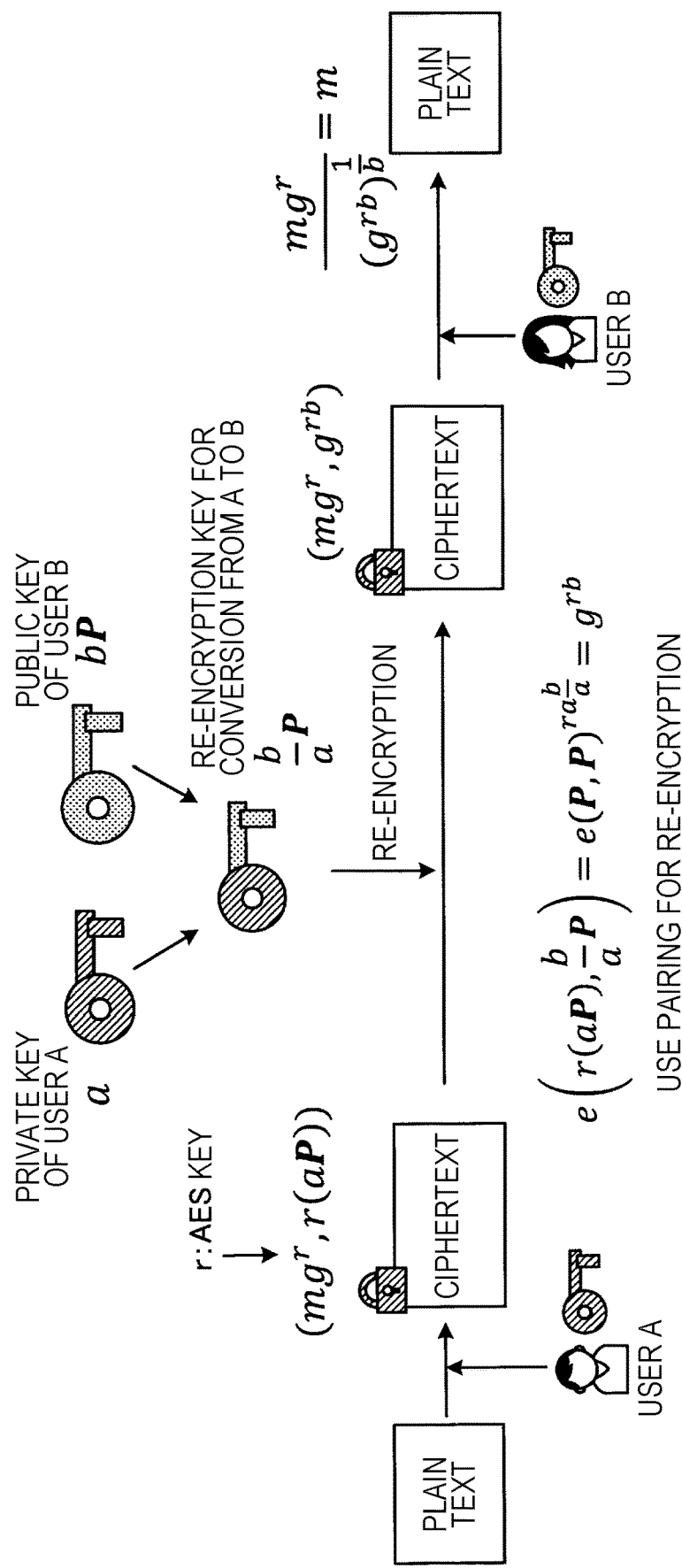
FIG. 16 is a diagram illustrating the proxy re-encryption processing in more detail.

FIG. 16 is a diagram illustrating the proxy re-encryption processing in more detail. In the example of FIG. 16, user A encrypts a plain text m. The ciphertext $(mg^r, r(aP))$ is re-encrypted with the re-encryption key $(b/a) P$ to be converted to the ciphertext $(mg^r, g^{rb})$. For the re-encryption pairing is used as illustrated in FIG. 16. The ciphertext $(mg^r, g^{rb})$ is decrypted with a private key of user B. Thus, user B can obtain the plain text m.

2.2. System Configuration Example

The outline of the re-encryption processing has been described above, but next, a configuration example of the information processing system according to the second embodiment will be described.

The configuration of the information processing system according to the second embodiment is similar to the configuration of the information processing system according to the first embodiment illustrated in FIG. 1. Referring to FIG. 1, the information processing system according to the second embodiment includes an information processing terminal 10 and an information processing server 20. Furthermore, the information processing terminal 10 and the information processing server 20 are connected via a network 30 so that they can communicate with each other.

2.3. Functional Configuration Example of Information Processing Terminal 10

Figure 17:
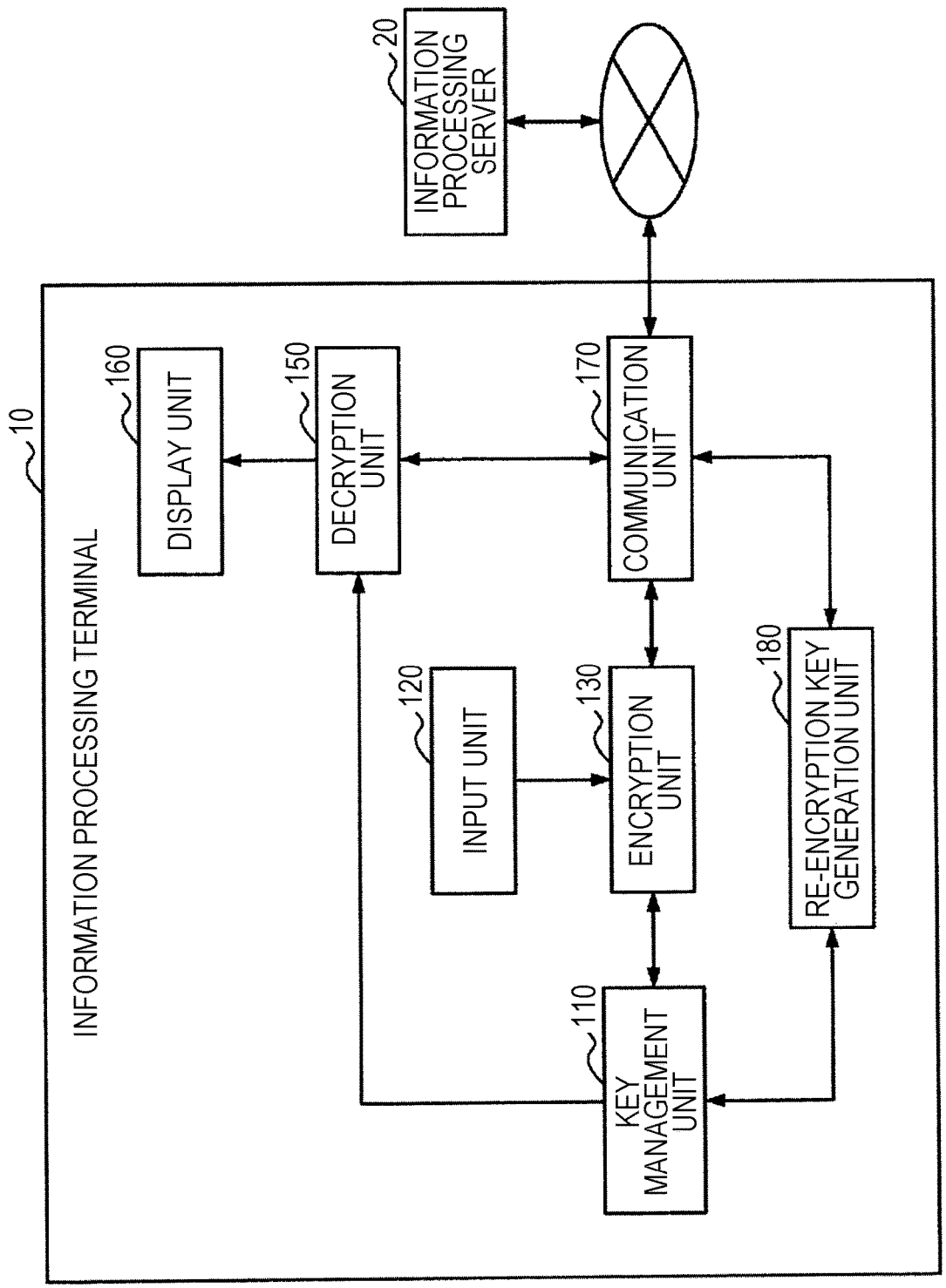
FIG. 17 is a block diagram illustrating a functional configuration example of an information processing terminal according to a second embodiment.

Next, a functional configuration example of the information processing terminal 10 according to the second embodiment of the present disclosure will be described in detail. FIG. 17 is a block diagram illustrating a functional configuration example of the information processing terminal 10 according to the second embodiment. Referring to FIG. 17, the information processing terminal 10 according to the second embodiment includes a key management unit 110, an input unit 120, an encryption unit 130, a decryption unit 150, a display unit 160, a communication unit 170, and a re-encryption key generation unit 180.

(Key Management Unit 110)

The key management unit 110 according to the second embodiment stores a unique key of a user, a common key received from the information processing server 20, a re-encryption key generated by the re-encryption key generation unit 180, and the like.

(Re-Encryption Key Generation Unit 180)

The re-encryption key generation unit 180 according to the second embodiment generates a re-encryption key by a re-encryption processing. The re-encryption key generation unit 180 according to the second embodiment performs re-encryption key generation processing on the common key having been used for encryption of words registered in the encryption dictionary 236 included in the information processing server 20, for example, to generate the re-encryption key. The details of the function of the re-encryption key generation unit 180 according to the second embodiment will be described later.

(Other Configurations)

The configurations of the input unit 120, the encryption unit 130, the decryption unit 150, the display unit 160, and the communication unit 170 are similar to those in the first embodiment.

The functional configuration example of the information processing terminal 10 according to the second embodiment has been described above. Note that the functional configuration described above with reference to FIG. 17 is merely an example, and the functional configuration of the information processing terminal 10 according to the second embodiment is not limited to the example. The functional configuration of the information processing terminal 10 according to the second embodiment can be flexibly modified according to specifications and operations.

2.4. Functional Configuration Example of Information Processing Server 20

Figure 18:
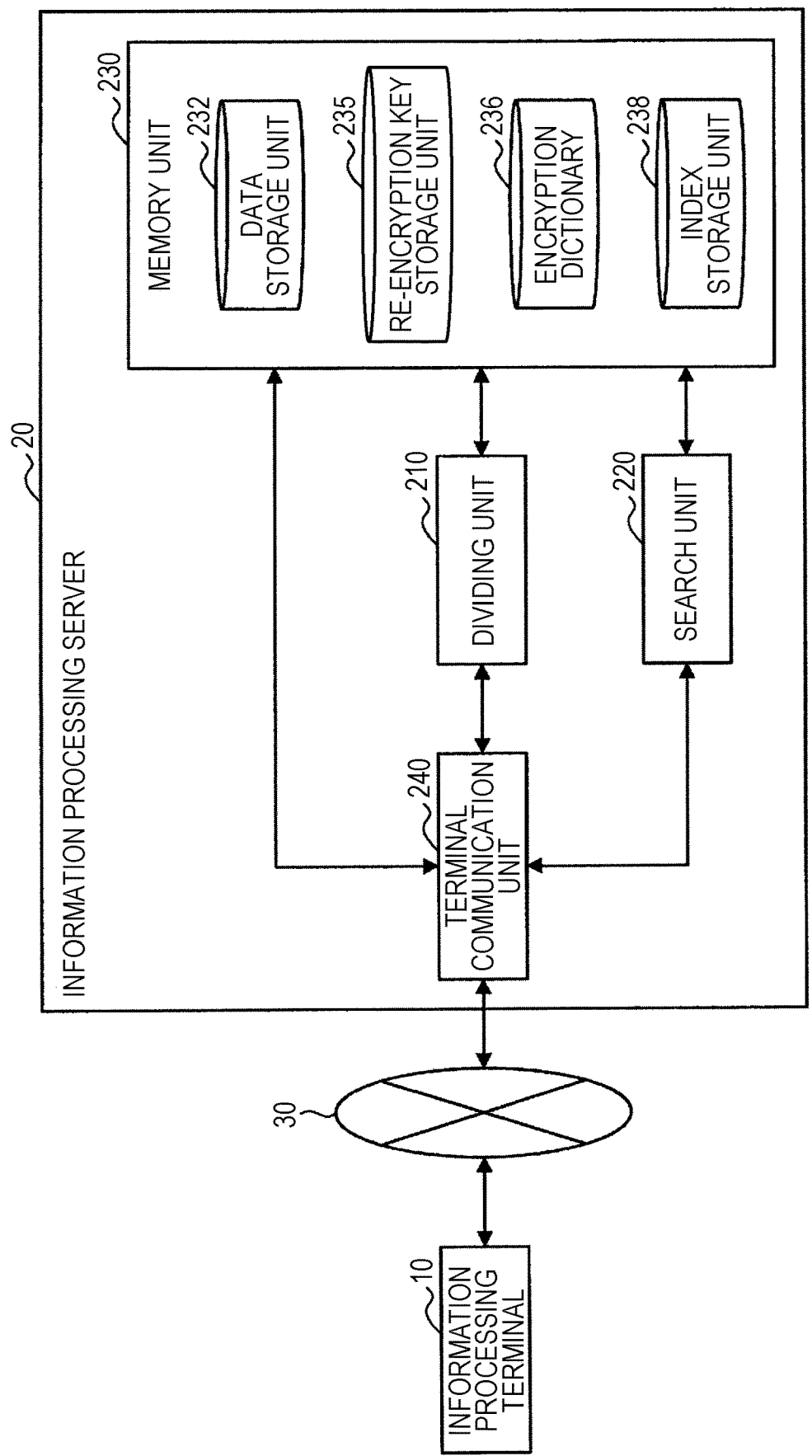
FIG. 18 is a block diagram illustrating a functional configuration example of an information processing server according to the second embodiment.

Next, a functional configuration example of the information processing server 20 according to the embodiment of the present disclosure will be described in detail. FIG. 18 is a block diagram illustrating a functional configuration example of the information processing server 20 according to the second embodiment. Referring to FIG. 18, the information processing server 20 according to the second embodiment includes a dividing unit 210, a search unit 220, a memory unit 230, and the terminal communication unit 240.

(Memory Unit 230)

The memory unit 230 according to the second embodiment stores various types of information related to document search. The memory unit 230 according to the second embodiment includes a data storage unit 232, a re-encryption key storage unit 235, an encryption dictionary 236, an index storage unit 238, and the like. The configurations of the data storage unit 232, the encryption dictionary 236, and the index storage unit 238 are similar to those of the first embodiment.

(Re-Encryption Key Storage Unit 235)

The re-encryption key storage unit 235 according to the second embodiment stores the re-encryption key received from the information processing terminal 10. Furthermore, the re-encryption key storage unit 235 according to the second embodiment stores information of the information processing terminal 10 and the user, which are the generation source of the re-encryption key, together with the re-encryption key.

(Other Configurations)

The configurations of the dividing unit 210, the search unit 220, and the terminal communication unit 240 are similar to those of the first embodiment.

The functional configuration example of the information processing server 20 according to the second embodiment has been described above. Note that the configuration described above with reference to FIG. 18 is merely an example, and the functional configuration of the information processing server 20 according to the second embodiment is not limited to the example. For example, the function of the search unit 220 according to the second embodiment may be implemented by a separate search device. The functional configuration of the information processing server 20 according to the second embodiment can be flexibly modified according to specifications and operations.

2.5. Details of Functions

Next, the functions of the information processing terminal 10 and the information processing server 20 according to the second embodiment will be described in detail. As described above, the information processing method according to the second embodiment reduces the processing load and achieves a more secure searchable encryption technique by causing the client and the server to share word division required for index creation.

Also in the information processing method according to the second embodiment, the encryption unit 130 of the information processing terminal 10 creates division candidates of words included in a document to be searched for. The encryption unit 130 then encrypts the division candidates and transmits the encrypted division candidates to the information processing server.

Next, the dividing unit 210 of the information processing server 20 matches the encrypted division candidates with the encryption dictionary 236, and creates a lattice structure necessary for morphological analysis. Subsequently, the dividing unit 210 determines the optimum division units of words for document search on the basis of the weight information on the lattice structure. Next, the encryption unit 130 of the information processing server 20 creates an index for full-text search for the document on the basis of the above-described division units, encrypts the index, and registers the encrypted index in the information processing server 20.

According to the above-described processing, it becomes possible to securely perform the full-text search of the encrypted document using the registered encrypted index. Furthermore, according to the information processing method according to the second embodiment, it is possible to create a situation in which a plain text is not exposed at all on the information processing server 20 by using the searchable encryption technique, and it is also possible to prevent unauthorized data acquisition by a service administrator or the like since the decryption key is not managed on the information processing server 20.

Hereinafter, each of pieces of processing included in the information processing method according to the second embodiment will be described in more detail. First, generation and storage of the sharing key according to the second embodiment will be described.

Figure 19:
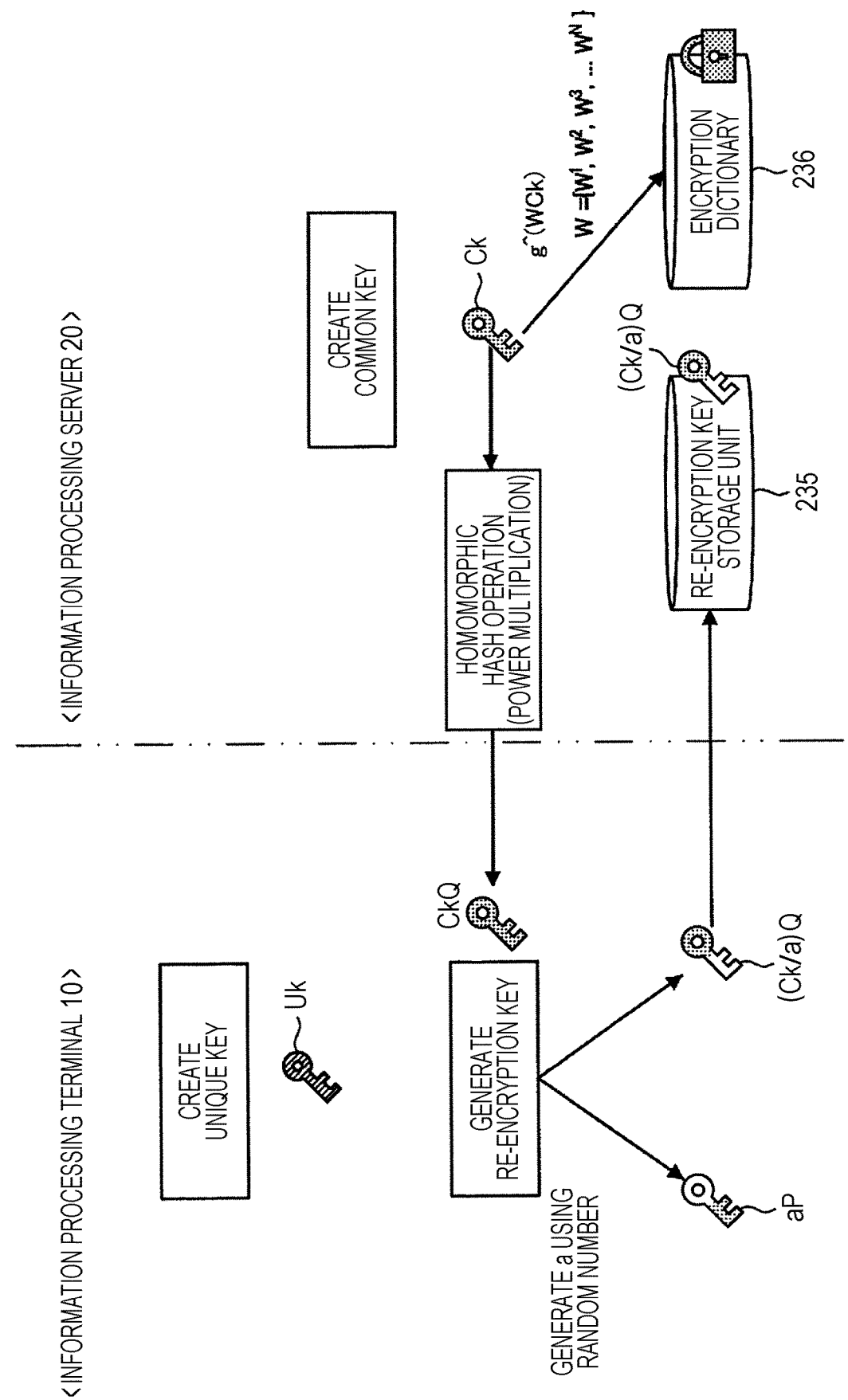
FIG. 19 is a diagram illustrating the flow of the initial setup according to the second embodiment.

FIG. 19 is a diagram illustrating the flow of the initial setup according to the second embodiment. Also in the initial setup according to the second embodiment, a unique key Uk of a user is generated in the information processing terminal 10 and a common key Ck is generated in the information processing server 20.

Here, also in the second embodiment, the common key Ck is a key for encrypting words registered in the encryption dictionary 236, and is commonly used by all users. Note that, in the second embodiment, in order to prevent the common key Ck from leaking to the information processing terminal 10, the information processing server 20 performs a homomorphic hash operation (power multiplication) on the common key Ck to generate the hashed common key CkQ.

Next, the secret sharing processing unit 140 of the information processing terminal 10 downloads the hashed common key Ck from the information processing server 20 via the communication unit 170, and performs re-encryption key generation processing on the common key Ck to generate a private key aP (first sharing key) and a re-encryption key CkQ (second sharing key). Note that at this time, the generated private key aP and the re-encryption key CkQ are different for each information processing terminal 10.

Here, the generated private key aP is stored by the key management unit 110, and the generated re-encryption key CkQ is transmitted by the communication unit 170 to the information processing server 20 (search device) and is stored in the re-encryption key storage unit 235.

Figure 20:
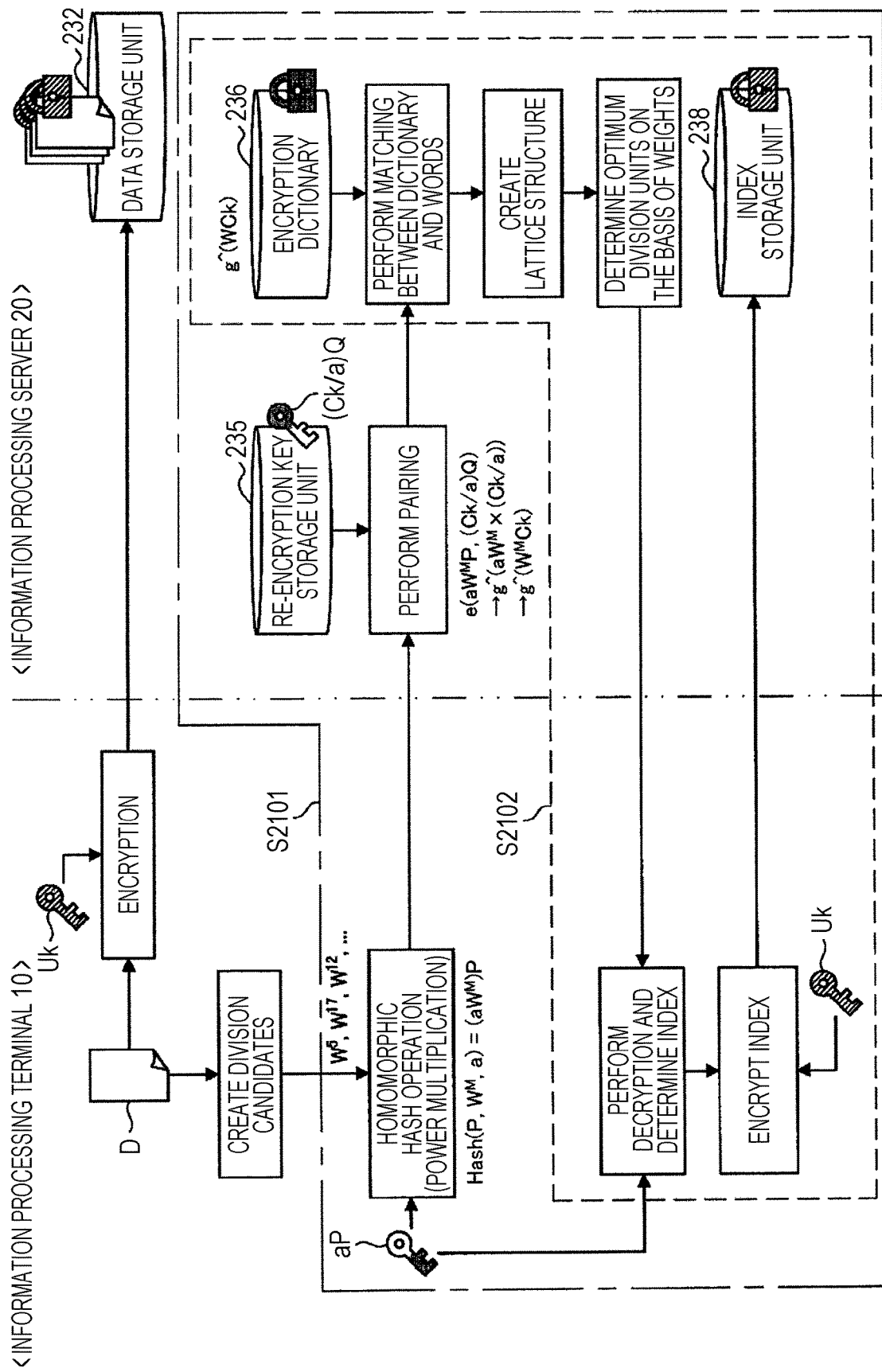
FIG. 20 is a diagram illustrating a flow of encrypted index generation according to the second embodiment.

Next, generation of the encrypted index according to the second embodiment will be described. FIG. 20 is a diagram illustrating a flow of encrypted index generation according to the second embodiment. Note that the processing indicated as step 2101 in FIG. 20 corresponds to the processing indicated as step S1101 in FIG. 5, and the processing illustrated as step 2102 in FIG. 20 corresponds to the subsequent processing illustrated as step S1102 in FIG. 5.

Here, first, a document to be searched for is generated by input by a user or the like. The encryption unit 130 encrypts the generated document D using the unique key Uk, and subsequently, the communication unit 170 transmits the encrypted document D to the information processing server 20. Furthermore, the data storage unit 232 of the information processing server 20 stores the encrypted document D received by the terminal communication unit 240.

Next, the encryption unit 130 according to the second embodiment generates a plurality of division candidates of words included in the document D. Then, the encryption unit 130 performs a homomorphic hash operation (power multiplication) using the private key aP on all of the generated division candidates to calculate a first hash value. Furthermore, the communication unit 170 transmits the calculated first hash value to the information processing server 20 (also referred to as an external device).

Next, the dividing unit 210 of the information processing server 20 performs pairing using the corresponding re-encryption key CkQ on the first hash value received by the terminal communication unit 240 from the information processing terminal 10 (also referred to as a terminal) to calculate a second hash value.

Subsequently, the dividing unit 210 determines the division units of words used for document search on the basis of the matching between the calculated second hash value and the encryption dictionary 236. More specifically, the dividing unit 210 matches the second hash value (word) with the encryption dictionary 236, and creates a lattice structure on the basis of the matching result. Next, the dividing unit 210 can perform morphological analysis based on the weight of the created lattice structure and determine the division units.

Other processing of the information processing terminal 10 and the information processing server 20 may be the same as those of the information processing terminal 10 and the information processing server 20 of the first embodiment.

The processing of the second embodiment has been described above. The processing of the second embodiment can also prevent words to be searched from leaking to other users similarly to the first embodiment.

Moreover, in the second embodiment, the information processing server 20 does not directly transmit the common key to a terminal, but transmits a homomorphic hashed value to the terminal. Therefore, the common key Ck held by the information processing server 20 does not leak to terminals. As a result, the safety of the matching method with the dictionary for performing morphological analysis is further improved.

3. Hardware Configuration Example

Figure 21:
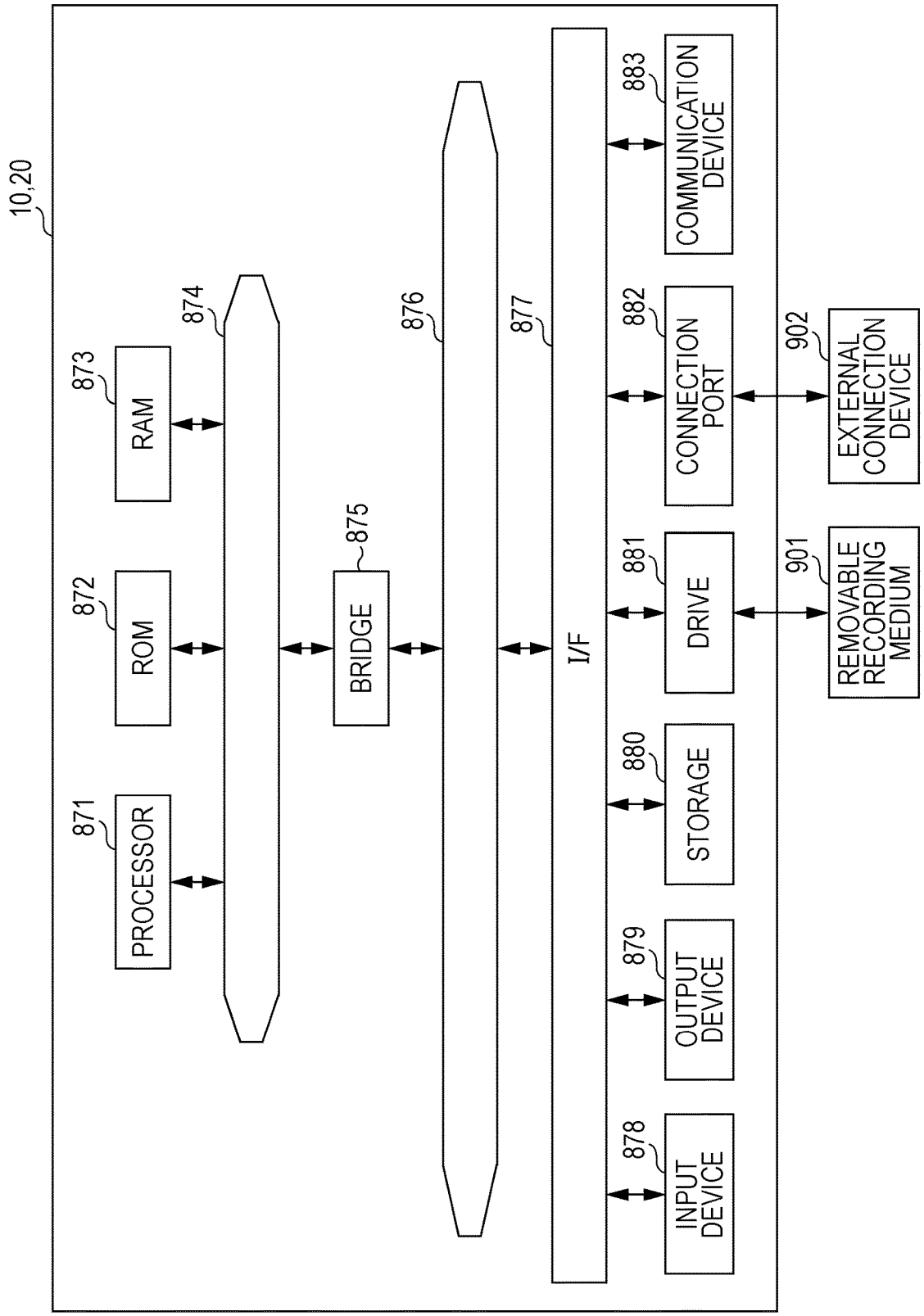
FIG. 21 is a diagram illustrating a hardware configuration example of the information processing terminal and the information processing server according to one embodiment of the present disclosure.

Next, a hardware configuration example common to the information processing terminal 10 and the information processing server 20 according to one embodiment of the present disclosure will be described. FIG. 21 is a block diagram illustrating a hardware configuration example of the information processing terminal 10 and the information processing server 20 according to the embodiment of the present disclosure. Referring to FIG. 21, the information processing terminal 10 and the information processing server 20 each includes, for example, a processor 871, a ROM 872, a RAM 873, a host bus 874, a bridge 875, an external bus 876, an interface 877, an input device 878 an output device 879, a storage 880, a drive 881, a connection port 882, and a communication device 883. Note that the hardware configuration described here is an example, and some of the components may be removed. Furthermore, components other than the components described here may be further included.

(Processor 871)

The processor 871 functions as, for example, an arithmetic processing unit or a control device, and controls all or a part of an operation of each component on the basis of various programs recorded in the ROM 872, the RAM 873, the storage 880, or a removable recording medium 901.

(ROM 872 and RAM 873)

The ROM 872 is means for storing programs loaded into the processor 871, data used for calculations, and the like. The RAM 873 temporarily or permanently stores, for example, a program loaded into the processor 871, various parameters that change as appropriate when the program is executed, and the like.

(Host Bus 874, Bridge 875, External Bus 876, and Interface 877)

The processor 871, the ROM 872, and the RAM 873 are connected to each other via, for example, the host bus 874 capable of high-speed data transmission. On the other hand, the host bus 874 is connected to the external bus 876, which has a relatively low data transmission speed, via, for example, the bridge 875. Furthermore, the external bus 876 is connected to various components via the interface 877.

(Input Device 878)

As the input device 878, for example, a mouse, a keyboard, a touch panel, buttons, switches, levers, and the like are used. Moreover, as the input device 878, a remote controller (hereinafter referred to as a remote controller) capable of transmitting a control signal using infrared rays or other radio waves may be used. Furthermore, the input device 878 includes a voice input device such as a microphone.

(Output Device 879)

The output device 879 is a device capable of notifying a user of acquired information visually or audibly, and may be, for example, a display device such as a cathode ray tube (CRT), an LCD, and an organic EL, an audio output device such as a speaker and headphones, and a printer, a mobile phone, a facsimile, and the like. Furthermore, the output device 879 according to the present disclosure includes various vibration devices capable of outputting a tactile stimulus.

(Storage 880)

The storage 880 is a device for storing various types of data. As the storage 880, for example, a magnetic storage device such as a hard disk drive (HDD), a semiconductor storage device, an optical storage device, an optical magnetic storage device, or the like is used.

(Drive 881)

The drive 881 is a device that reads information recorded, for example, in a removable recording medium 901 such as a magnetic disk, an optical disk, a magneto-optical disk, or a semiconductor memory, and writes information to the removable recording medium 901.

(Removable Recording Medium 901)

The removable recording medium 901 is, for example, a DVD medium, a Blu-ray (registered trademark) medium, an HD DVD medium, various semiconductor storage media, or the like. Of course, the removable recording medium 901 may be, for example, an IC card having a non-contact IC chip mounted thereon, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal, for example.

(External Connection Device 902)

The external connection device 902 is, for example, a printer, a portable music player, a digital camera, a digital video camera, an IC recorder, or the like.

(Communication Device 883)

The communication device 883 is a communication device for connecting to a network, and is, for example, a communication card for wired or wireless LAN, Bluetooth (registered trademark), or wireless USB (WUSB), a router for optical communication, and a router for asymmetric digital subscriber line (ADSL), a modem for various types of communication, or the like.

4. Summary

As described above, the information processing server 20 according to the embodiment of the present disclosure includes the terminal communication unit 240 that receives the first hash value calculated using the first sharing key from the information processing terminal 10, and the dividing unit 210 that performs a homomorphic hash operation on the first hash value using the second sharing key corresponding to the first sharing key and determines division units of words used for document search on the basis of matching between the calculated second hash value and an encryption dictionary. Furthermore, the above-described terminal communication unit 240 transmits encrypted information related to the division units determined by the dividing unit 210 to the information processing terminal 10.

Furthermore, the information processing terminal 10 according to the embodiment of the present disclosure includes the encryption unit 130 that performs a homomorphic hash operation using the first sharing key on division candidates for words included in a document to be searched for to calculate a first hash value, and the communication unit 170 that transmits the first hash value to the information processing server 20. Furthermore, the above-described communication unit 170 receives, from the information processing server 20, encrypted information that is determined on the basis of matching between the encryption dictionary and the second hash value, which is calculated by the homomorphic hash operation using the second sharing key corresponding to the first hash value, and that is related to division units of words for document search.

According to the above-described configuration, it is possible to reduce the processing load and achieve a more secure searchable encryption technique.

Although the preferred embodiments of the present disclosure have been described in detail with reference to the accompanying drawings, the technical scope of the present disclosure is not limited to such examples. It is obvious that a person having ordinary knowledge in the technical field of the present disclosure can come up with various changes or modifications within the scope of the technical idea described in the claims, and it is understood naturally that such changes and modifications also belong to the technical scope of the present disclosure.

Furthermore, the effects described herein are merely explanatory or exemplary and are not limited. That is, the techniques according to the present disclosure may exhibit other effects apparent to those skilled in the art from the present specification, in addition to or in place of the above-described effects.

Furthermore, it is possible to make a program that causes hardware such as a CPU, a ROM, and a RAM built in a computer to exert the same functions as the configuration of the information processing server 20, and a computer-readable and non-transient recording medium having the program recorded thereon may also be provided.

Furthermore, each step related to the processing of the information processing server 20 of the present specification does not necessarily have to be processed chronologically in the order illustrated in the drawing. For example, each step related to the processing of the information processing server 20 may be processed in an order different from the order illustrated in the drawing, or may be processed in parallel.

Note that configurations described later also belong to the technical scope of the present disclosure.

(1)

An information processing device comprising:
 a communication unit configured to receive a first hash value calculated using a first sharing key from a terminal; and
 a dividing unit configured to determine a division unit of a word used for document search on a basis of matching between an encryption dictionary and a second hash value that is calculated by performing a homomorphic hash operation on the first hash value using a second sharing key corresponding to the first sharing key, in which
 the communication unit transmits, to the terminal, encrypted information related to the division unit determined by the dividing unit.

(2)

The information processing device according to above-described (1), in which
 the first hash value is a value obtained by hashing a division candidate of a word included in a document to be searched for by a homomorphic hash operation using the first sharing key.

(3)

The information processing device according to above-described (2), in which
 a word division accuracy related to the first hash value is lower than a word division accuracy by the dividing unit.

(4)

The information processing device according to above-described (1), in which
 the dividing unit determines the division unit by morphological analysis.

(5)

The information processing device according to above-described (4), in which the dividing unit creates a lattice structure on a basis of matching between the second hash value and the encryption dictionary, and determines the division unit on a basis of a weight on the lattice structure.

(6)

The information processing device according to any one of above-described (1) to (5), in which the first sharing key and the second sharing key are generated by performing secret sharing processing on a common key having been used for encryption of a word registered in the encryption dictionary, and the communication unit receives the second sharing key from the terminal.

(7)

The information processing device according to any one of above-described (1) to (6), in which the communication unit receives, from the terminal, an encrypted index generated on a basis of encrypted information related to the division unit.

(8)

The information processing device according to above-described (7) further comprising a search unit configured to search for a document on a basis of an encrypted keyword and the encrypted index received from the terminal by the communication unit.

(9)

The information processing device according to above-described (8), in which the encrypted keyword and the encrypted index are mapped to a Bloom filter.

(10)

An information processing device comprising:

an encryption unit configured to calculate a first hash value by performing a homomorphic hash operation, using a first sharing key, on a division candidate of a word included in a document to be searched for; and a communication unit configured to transmit the first hash value to an external device, in which the communication unit receives, from the external device, encrypted information related to a division unit of a word for document search that is determined on a basis of matching between an encryption dictionary and a second hash value calculated by a homomorphic hash operation using a second sharing key corresponding to the first hash value.

(11)

The information processing device according to above-described (10), further comprising a secret sharing processing unit configured to perform secret sharing processing on a common key having been used for encryption of a word to be registered in the encryption dictionary to generate the first sharing key and the second sharing key, in which the communication unit transmits the second sharing key to the external device.

(12)

The information processing device according to above-described (11), in which the encryption unit generates an encrypted document by encrypting the document to be searched for with a unique key, and an encrypted index by encrypting the division unit with the unique key, and the communication unit transmits the encrypted document and the encrypted index to a search device.

(13)

The information processing device according to above-described (12), in which the encryption unit generates an encrypted keyword by encrypting, with the unique key, a search keyword that is input, and the communication unit transmits the encrypted keyword to the search device and receives a search result.

(14)

The information processing device according to any one of above-described (10) to (13), in which the division unit is determined by morphological analysis using the encryption dictionary.

(15)

The information processing device according to above-described (14), in which the encryption unit determines the division candidate by morphological analysis, and the number of words registered in a dictionary used for morphological analysis by the encryption unit is smaller than the number of words registered in the encryption dictionary.

(16)

The information processing device according to above-described (14), in which the encryption unit determines the division candidate using N-Gram.

(17)

The information processing device according to above-described (12), in which the secret sharing processing unit performs secret sharing processing on the encrypted document and the unique key having been used for generation of the encrypted index to generate a third sharing key and a fourth sharing key, and the communication unit transmits the third sharing key to a search authorized terminal, and transmits the fourth sharing key to the search device.

(18)

The information processing device according to above-described (13) further comprising a decryption unit configured to decrypt the search result.

(19)

An information processing method performed by a processor, the information processing method comprising:

receiving a first hash value calculated using a first sharing key from a terminal; and determining a division unit of a word used for document search on a basis of matching between an encryption dictionary and a second hash value that is calculated by performing a homomorphic hash operation on the first hash value using a second sharing key corresponding to the first sharing key, and transmitting, to the terminal, encrypted information related to the division unit.

(20)

An information processing method performed by a processor, the information processing method comprising:

calculating a first hash value by performing a homomorphic hash operation, using a first sharing key, on a division candidate of a word included in a document to be searched for;

transmitting the first hash value to an external device; and receiving, from the external device, encrypted information related to a division unit of a word for document search that is determined on a basis of matching between an encryption dictionary and a second hash value calculated by a homomorphic hash operation using a second sharing key corresponding to the first hash value.

REFERENCE SIGNS LIST

10 Information processing terminal
110 Key management unit
130 Encryption unit
140 Secret sharing processing unit
150 Decryption unit
170 Communication unit
180 Re-encryption key generation unit
20 Information processing server
210 Dividing unit
220 Search unit
232 Data storage unit
234 Sharing key storage unit
235 Re-encryption key storage unit
236 Encryption dictionary
238 Index storage unit
240 Terminal communication unit

The invention claimed is:

1. An information processing device comprising:
a communication unit configured to receive a first hash value calculated using a first sharing key from a terminal; and
a dividing unit configured to determine a division unit of a word used for document search on a basis of matching between an encryption dictionary and a second hash value that is calculated by performing a homomorphic hash operation on the first hash value using a second sharing key corresponding to the first sharing key, wherein
the communication unit transmits, to the terminal, encrypted information related to the division unit determined by the dividing unit, and
the communication unit and the dividing unit are each implemented via at least one processor.

2. The information processing device according to claim 1, wherein
the first hash value is a value obtained by hashing a division candidate of a word included in a document to be searched for by a homomorphic hash operation using the first sharing key.

3. The information processing device according to claim 2, wherein
a word division accuracy related to the first hash value is lower than a word division accuracy by the dividing unit.

4. The information processing device according to claim 1, wherein
the dividing unit determines the division unit by morphological analysis.

5. The information processing device according to claim 4, wherein
the dividing unit creates a lattice structure on a basis of matching between the second hash value and the encryption dictionary, and determines the division unit on a basis of a weight on the lattice structure.

6. The information processing device according to claim 1, wherein
the first sharing key and the second sharing key are generated by performing secret sharing processing on a common key having been used for encryption of a word registered in the encryption dictionary, and
the communication unit receives the second sharing key from the terminal.

7. The information processing device according to claim 1, wherein
the communication unit receives, from the terminal, an encrypted index generated on a basis of encrypted information related to the division unit.

8. The information processing device according to claim 7 further comprising
a search unit configured to search for a document on a basis of an encrypted keyword and the encrypted index received from the terminal by the communication unit, wherein the search unit is implemented via at least one processor.

9. The information processing device according to claim 8, wherein the encrypted keyword and the encrypted index are mapped to a Bloom filter.

10. An information processing device comprising:
an encryption unit configured to calculate a first hash value by performing a homomorphic hash operation, using a first sharing key, on a division candidate of a word included in a document to be searched for; and
a communication unit configured to transmit the first hash value to an external device, wherein
the communication unit receives, from the external device, encrypted information related to a division unit of a word for document search that is determined on a basis of matching between an encryption dictionary and a second hash value calculated by a homomorphic hash operation using a second sharing key corresponding to the first hash value, and
the encryption unit and the communication unit are each implemented via at least one processor.

11. The information processing device according to claim 10, further comprising
a secret sharing processing unit configured to perform secret sharing processing on a common key having been used for encryption of a word to be registered in the encryption dictionary to generate the first sharing key and the second sharing key, wherein
the communication unit transmits the second sharing key to the external device, and
the secret sharing processing unit is implemented via at least one processor.

12. The information processing device according to claim 11, wherein the encryption unit generates an encrypted document by encrypting the document to be searched for with a unique key, and an encrypted index by encrypting the division unit with the unique key, and
the communication unit transmits the encrypted document and the encrypted index to a search device.

13. The information processing device according to claim 12, wherein
the encryption unit generates an encrypted keyword by encrypting, with the unique key, a search keyword that is input, and
the communication unit transmits the encrypted keyword to the search device and receives a search result.

14. The information processing device according to claim 10, wherein
the division unit is determined by morphological analysis using the encryption dictionary.

15. The information processing device according to claim 14, wherein
the encryption unit determines the division candidate by morphological analysis, and
the number of words registered in a dictionary used for morphological analysis by the encryption unit is smaller than the number of words registered in the encryption dictionary.

16. The information processing device according to claim 14, wherein the encryption unit determines the division candidate using N-Gram.

17. The information processing device according to claim 12, wherein the secret sharing processing unit performs secret sharing processing on the encrypted document and the unique key having been used for generation of the encrypted index to generate a third sharing key and a fourth sharing key, and the communication unit transmits the third sharing key to a search authorized terminal, and transmits the fourth sharing key to the search device.

18. The information processing device according to claim 13 further comprising a decryption unit configured to decrypt the search result, wherein the decryption unit is implemented via at least one processor.

19. An information processing method performed by a processor, the information processing method comprising:

receiving a first hash value calculated using a first sharing key from a terminal; and determining a division unit of a word used for document search on a basis of matching between an encryption dictionary and a second hash value that is calculated by performing a homomorphic hash operation on the first hash value using a second sharing key corresponding to the first sharing key, and transmitting, to the terminal, encrypted information related to the division unit.

20. An information processing method performed by a processor, the information processing method comprising:

calculating a first hash value by performing a homomorphic hash operation, using a first sharing key, on a division candidate of a word included in a document to be searched for;

transmitting the first hash value to an external device; and receiving, from the external device, encrypted information related to a division unit of a word for document search that is determined on a basis of matching between an encryption dictionary and a second hash value calculated by a homomorphic hash operation using a second sharing key corresponding to the first hash value.

* * * * *